July 5, 1960 A. G. THOMAS 2,943,906
DEVICE FOR MAKING TAPE AND OTHER RECORDS
Filed Jan. 14, 1957 5 Sheets-Sheet 1

INVENTOR
Albert G. Thomas

July 5, 1960
A. G. THOMAS
2,943,906
DEVICE FOR MAKING TAPE AND OTHER RECORDS
Filed Jan. 14, 1957
5 Sheets-Sheet 2
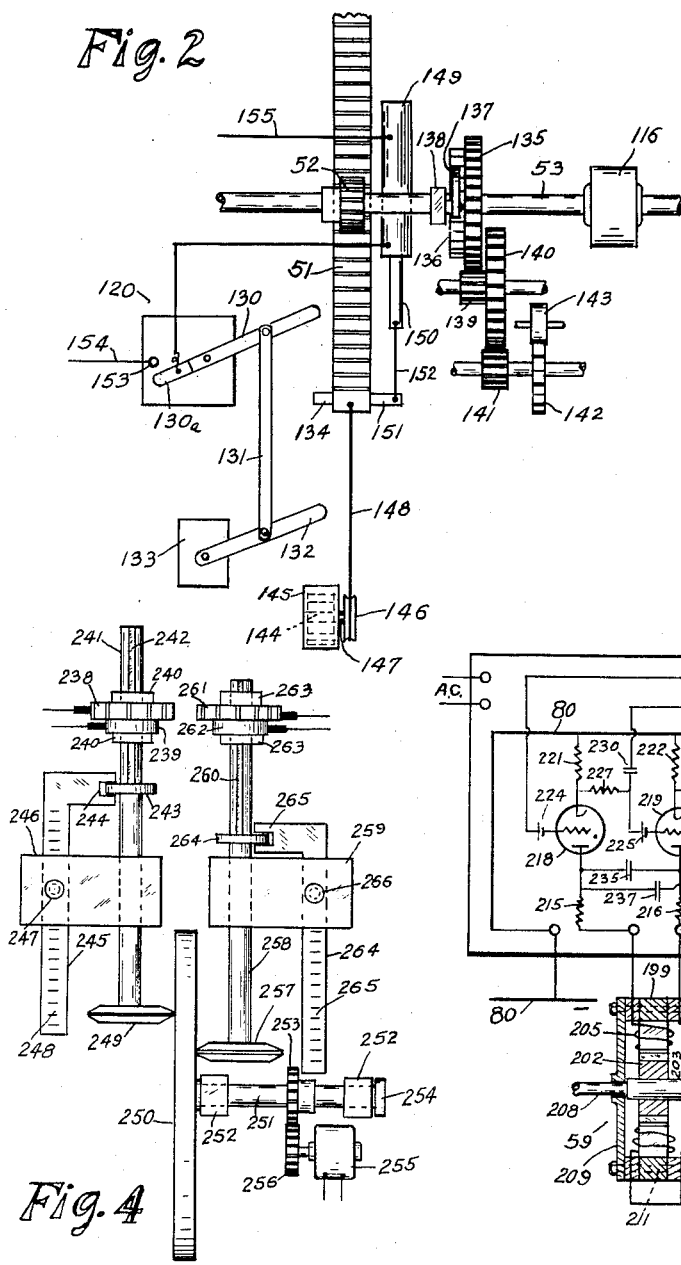
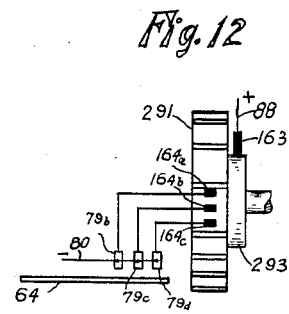
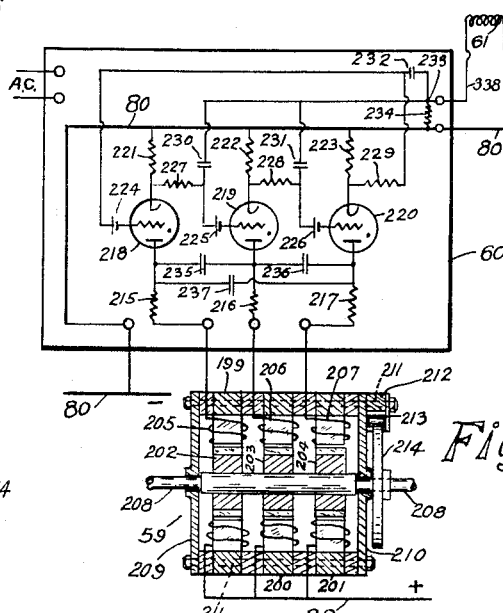
INVENTOR.
Albert G. Thomas July 5, 1960            A. G. THOMAS            2,943,906
DEVICE FOR MAKING TAPE AND OTHER RECORDS
Filed Jan. 14, 1957            5 Sheets-Sheet 3
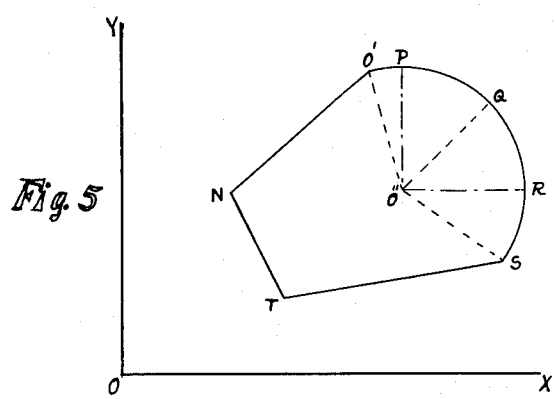
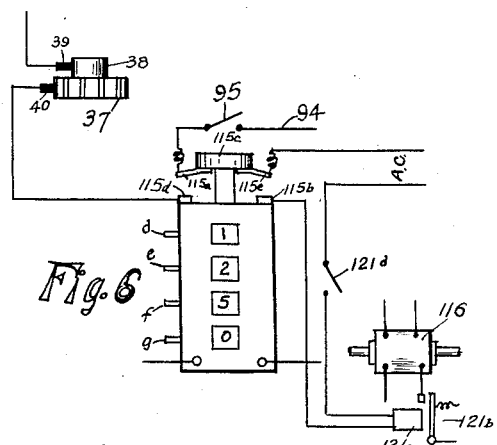
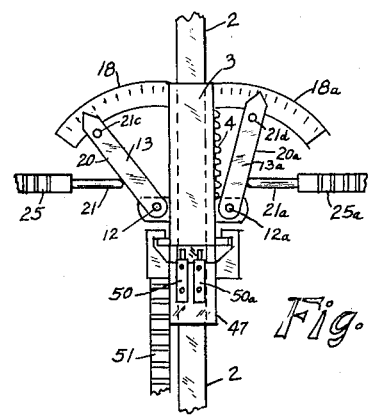
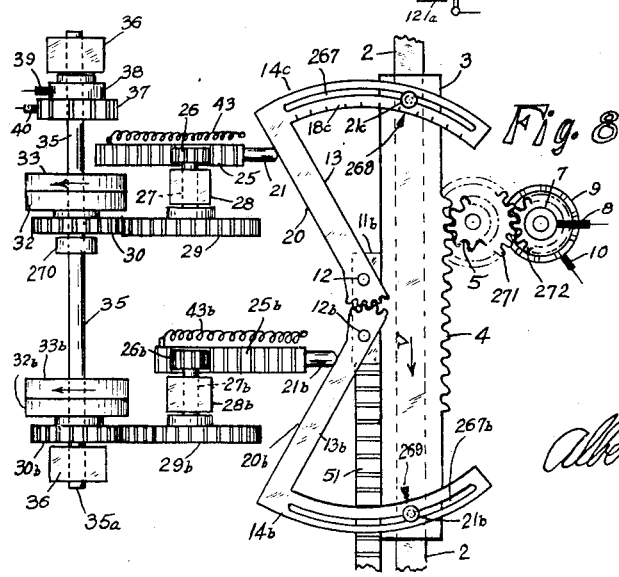
INVENTOR.
Albert G. Thomas July 5, 1960
A. G. THOMAS
2,943,906
DEVICE FOR MAKING TAPE AND OTHER RECORDS
Filed Jan. 14, 1957
5 Sheets-Sheet 4
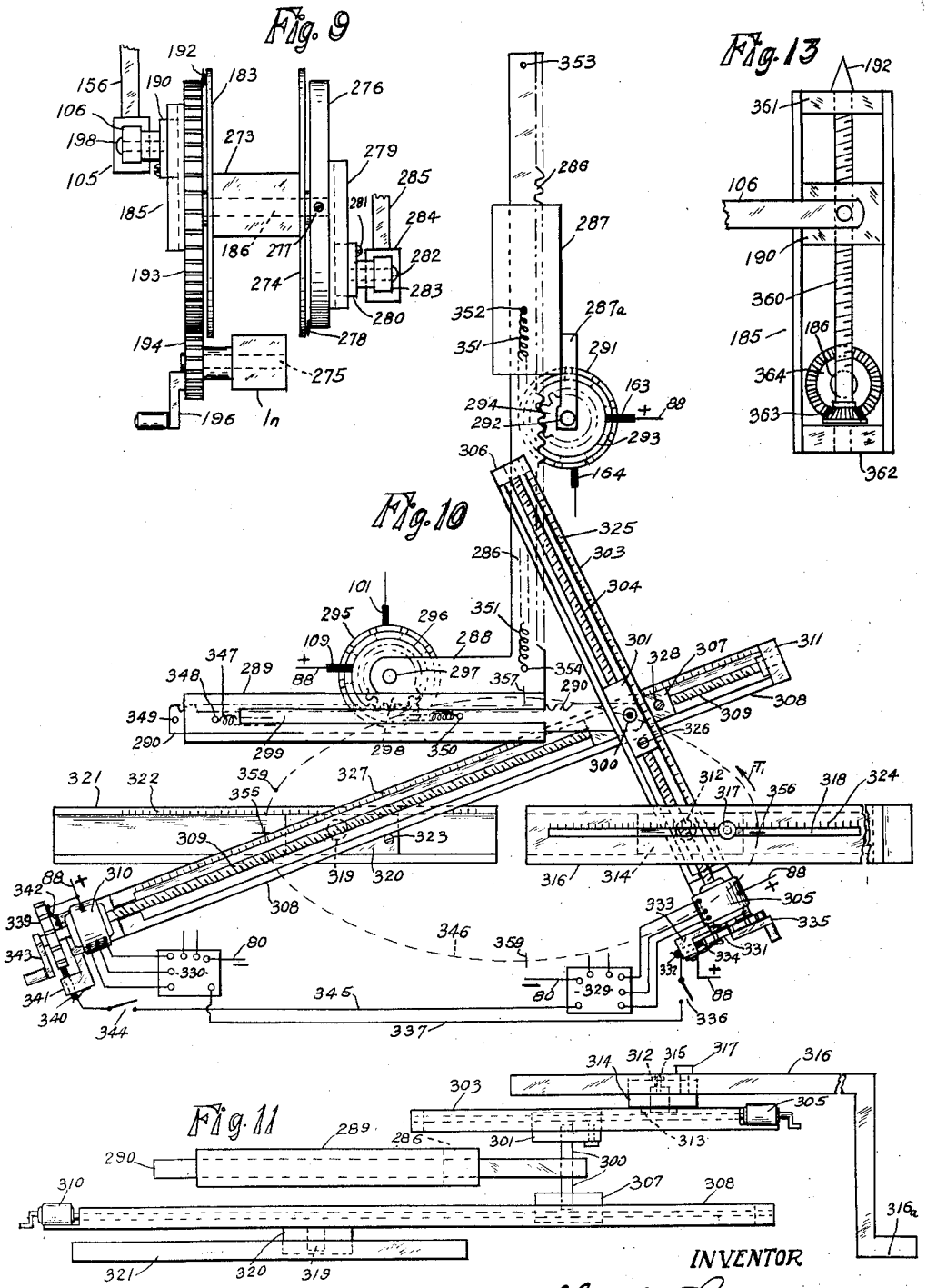
INVENTOR
Albert G. Thomas

United States Patent Office 2,943,906
Patented July 5, 1960

2,943,906

DEVICE FOR MAKING TAPE AND OTHER RECORDS

Albert G. Thomas, Butler, Pa., assignor to Industrial Controls Corporation, Chattanooga, Tenn., a corporation of Tennessee Filed Jan. 14, 1957, Ser. No. 633,904

36 Claims. (Cl. 346—33)

This invention relates to means for making a tape or any other suitable record which may be used to control other devices such as motors, and especially step motors of the type described in my U.S. Patents Nos. 2,774,922; 2,782,354; 2,787,719; 2,806,987; 2,808,556; 2,830,246; 2,830,247.

In some of the above applications I have described how my step motors may be employed for servo-systems, positioning and indexing operations, for machine tool controls and for various other purposes. An important requisite for automatic operation of machine tools, and for some other devices likewise, is a simple device or method for making a tape or other record such as cards or the equivalent, to control the step motor or motors in the desired manner. In this application the word "tape" will be used to denote a film, tape, cards, drums, or any other record suitable for storing information or controlling characteristics, whether as punched holes, magnetized or conductive spots, embossed areas, capacitive elements, or otherwise.

There are a number of automatic machine tool controls today and perhaps the greatest difficulty facing all of them is the question of how to make the controlling tapes simply and economically. They have relied, for the most part, on complicated calculations in order to set up involved programs for directing their controls. Some of them advocate the use of the costly electronic computers, especially for complicated configurations. This is, however, both an inconvenient and an expensive procedure and has caused many possible users of automatic machine tool or other automatic controls to defer actual installation.

In order to overcome these and other objections to prior practice in making tapes, punched cards, or other records for controlling automatically the movements of machine members or other devices, I have designed a relatively simple tape maker which is highly versatile, can be easily made, and which can be operated satisfactorily by relatively unskilled personnel after a very short period of instruction.

An object is to provide a tape maker which can be easily used to make a tape representing configuration or other properties of an object and which does not require complicated calculations.

Another object is to provide a tape maker which can be quickly set and used without making models or drawings to be traced.

A further object is to provide a tape maker which can be used to make a tape to represent straight lines of various lengths at various angles to a reference.

Another object is the provision of a tape maker which can be used to make a tape representing circles of various diameters and also arcs of various lengths and radius of curvature.

An additional object is the provision of a tape maker which can be easily employed to make a tape representing curves of various lengths and various shapes or contours.

A further object is to provide a tape maker which can be readily used to make a tape or tapes representing straight lines at various angles, circles or arcs of various radii, and also curves of complicated or irregular shape, and ellipses.

Other objects will be apparent in the following description.

In the drawings:

Figure 2 is a partial plan view of a modified rack reciprocating mechanism, which may be used in the device of Figure 1.

Figure 3 is a circuit diagram showing a circuit for controlling the step motor employed in Figure 1, the motor being shown in part sectional elevation.

Figure 4 is a plan view of a modification of the pulsing mechanism for making tapes representing angles.

Figure 5 is a diagram of a shape for which it is desired to make a tape which will cause associated means to trace out or reproduce that shape.

Figure 6 is a plan view of a modified electromagnetic counter adapted to cut off a drive motor as well as to stop intermittent energization of recording heads, after a predetermined number of operations.

Figure 7 is a fragmentary plan view of means for recording two groups of pulses representing movement along two angles, simultaneously. One of these groups may be associated with movement in a third dimension.

Figure 8 is a partial plan view of reciprocating mechanism for producing pulses during travel of the reciprocating member in both directions, for making a tape or other record representing movement at various angles to a reference.

Figure 9 is an elevation showing modified mechanism of Figure 1, for making a tape representing movement along two circular paths.

Figure 10 is a plan view of pulse producing means to be used with the device of Figure 1, for making tapes representing ellipses or partial ellipses.

Figure 11 is a front elevation of the device of Figure 10 but drawn to a different scale.

Figure 12 is a partial plan view of a modified commutator and recording system, using three recording heads for making a tape for controlling step motor speed.

Figure 13 is a plan view of modified slide-moving mechanism which may be used in the device of Figure 1 for making tapes representing spiral movement.

Figure 1:
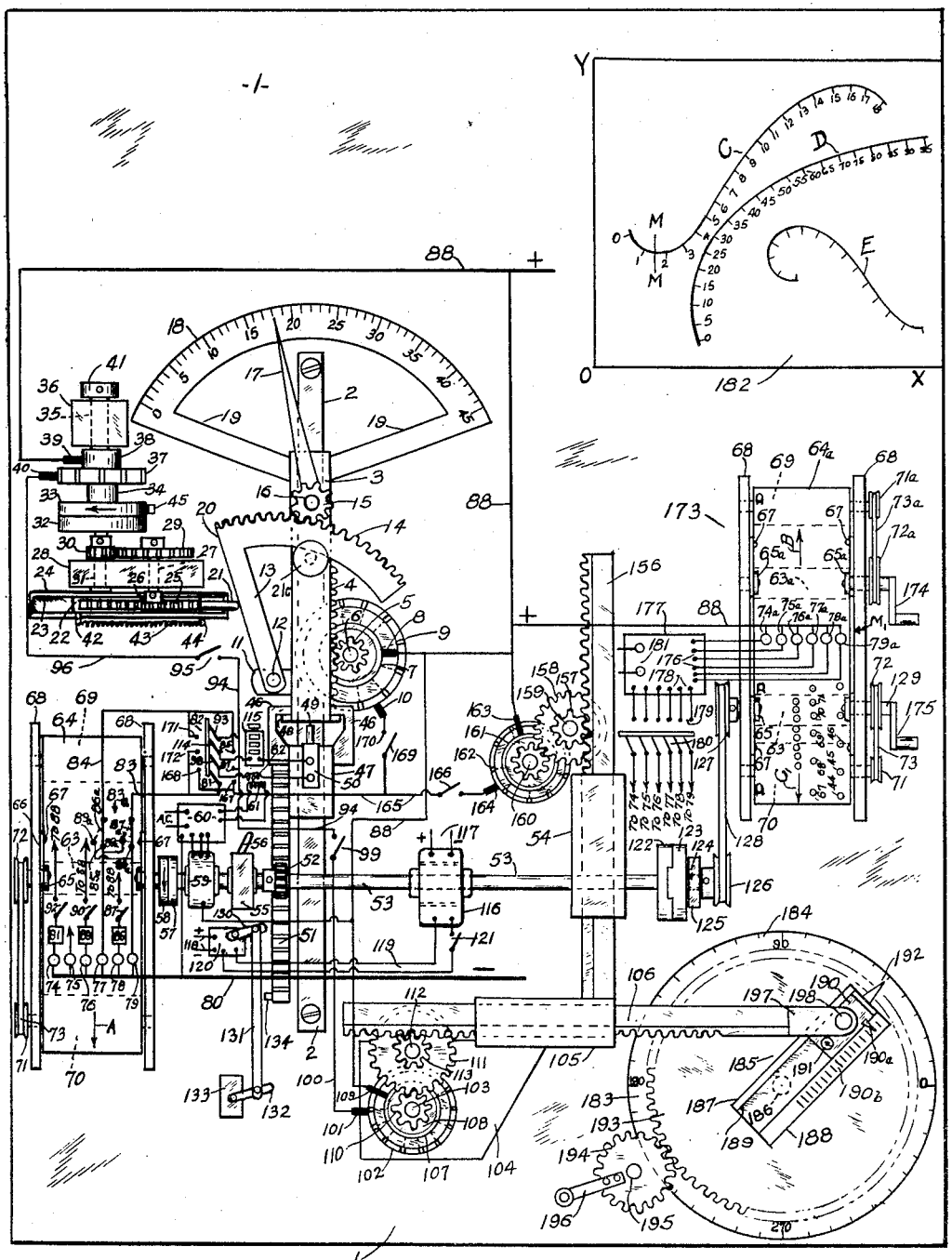
Figure 1 is a plan view of the combined tape maker for making tapes to correspond to straight lines, arcs and circles, and complicated curves.
Figure 1A:
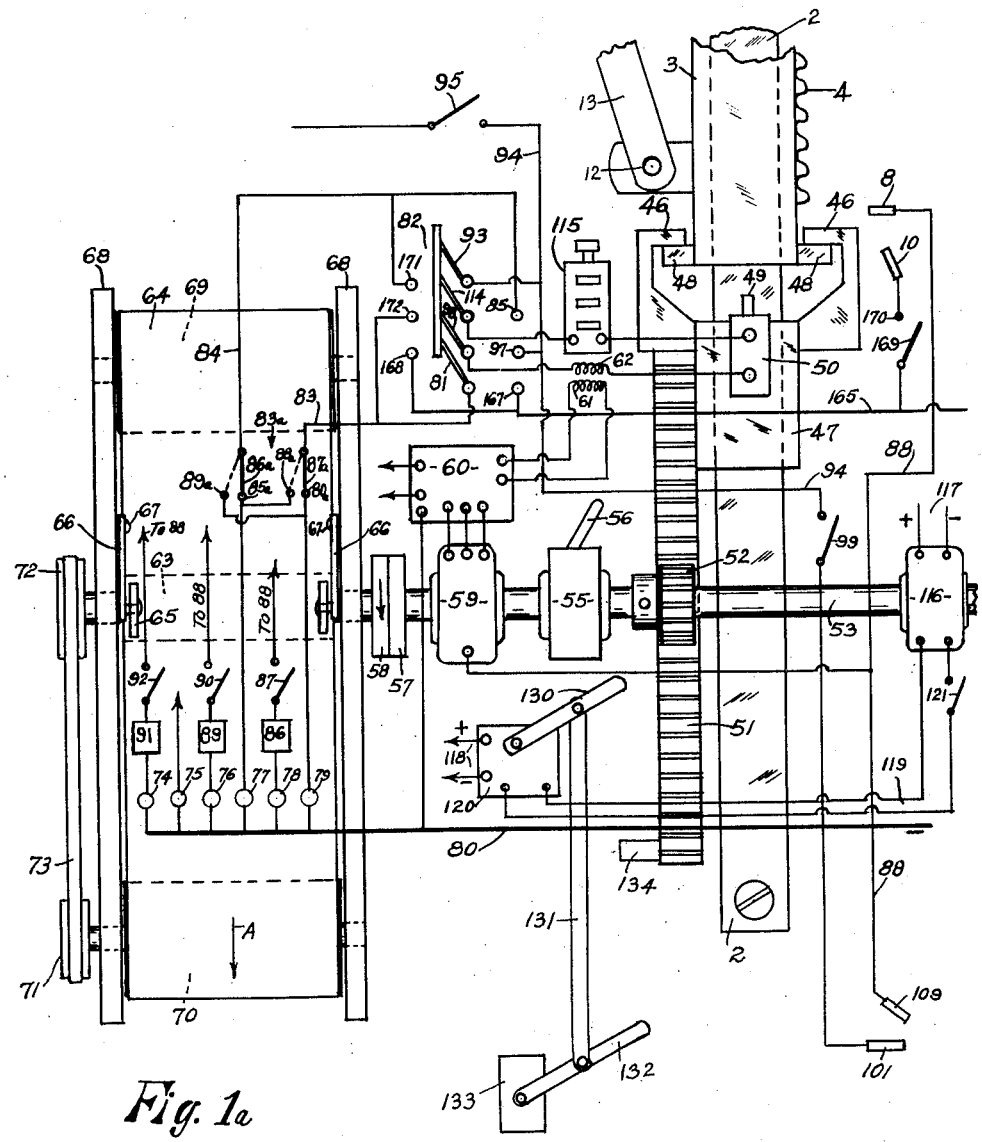
Figure 1a is an enlargement of the lower left portion of Figure 1.

In Figure 1 the various tape maker components are fastened to or mounted on table or plate 1 which may be of steel or of any suitable material. Elongated rectangular bar 2 is screwed to plate 1 with suitable end supports or stand-offs holding the bar away from the plate a suitable distance. Sleeve-like slide 3 is movable along the bar and has integral or attached rack teeth 4 which are meshed with pinion 5 which is fastened to stub shaft 6 rotatable in a suitable bearing in plate 1. Slip ring 7 is mounted on an insulating disc attached to this shaft and has brush 8 normally in contact with the slip ring. Commutator 9 is fastened to shaft 6 but is insulated therefrom. The commutator bars are equally spaced and are electrically connected with slip ring 7. The spaces between the commutator bars are filled with insulating material like Lucite or other plastic, or mica or the equivalent. The peripheral or other working surface of the commutator is turned smooth so that brush 10 will ride thereon without appreciable bounce.

Ear 11 projects from slide 3 and has a hole through which pivot pin 12, which also passes through a hole near the end of arm 13, is passed in order to pivot arm 13 to the ear. Arcuate rack element 14 is integral with arm 13 and the rack teeth are concentric with pivot 12. This rack is meshed with pinion 15 rotatable on stub shaft 16 which is attached to slide 3. Pointer 17 is fastened to the underside of pinion 15, and is movable over scale 18 which is attached to slide 3 by means of arms 19. This scale is placed so that it does not strike bar 2 as the slide is moved along the bar. The pointer and scale provide means for indicating the angle which hardened edge 20 of arm 13 makes with respect to the long axis of bar 2. Thumbscrew 21c, threaded into a hole in slide 3, may be turned to clamp rack 14 in any position in which it is set. Scale 18 may be marked off in degrees and fractions of degrees. The gear ratio of the rack 14 and pinion 15, and the length of pointer 17 may be chosen to provide the accuracy desired. A vernier, enlarging lens, or other means may be used to increase the accuracy of setting. A screw may be employed to set edge 20 at the desired angle.

Rounded, hardened rod 21 is attached to slide or bar 22 which is movable in slot 23 in larger bar 24 attached to plate 1. Rack 25 is cut integral with bar 22 or is attached thereto and is meshed with pinion 26 fastened to shaft 27 which is rotatable in a bearing in block 28 rising from plate 1. The other end of shaft 27 carries attached gear 29 which is meshed with pinion 30 fastened to shaft 31 which is rotatable in a bearing in block 28 and which carries an end flange to prevent axial play. Driving member 32 of overrunning clutch 32—33 is fastened to shaft 31 and rotates therewith. Driven member 33 of the clutch is attached to enlarged part 34 of shaft 35 which is rotatable in a bearing in riser 36 from plate 1. Commutator 37 and attached slip ring 38 are similar in construction to commutator 9 and slip ring 7 and are attached to shaft 35. Brush 39 is in contact with slip ring 38 and brush 40 is pressed against commutator 37. Collar 41 may be attached to shaft 35 to limit end play. Pin 42 extends from bar 22 and one end of tension spring 43 is attached to the pin. The other end of this spring is fastened to pin 44, rising from plate 1. The word "commutator" is used to denote any suitable type of make-and-break switch.

The overrunning clutch 32—33 may be of any suitable type such as those using balls or rollers to cause rotation of driven element 33 in the direction of the arrow but not in opposite direction. A friction brake 45 or other braking device of mechanical, magnetic, or electrical nature may be used to prevent over-travel of clutch element 33 when released.

Hooks 46 are integral with or welded to short sleeve or slide 47 which is movable along bar 2. These hooks engage ears 48 projecting from slide 3 when slide 47 is moved in a direction away from scale 18. When slide 47 is moved in opposite direction button or rod 49 of normally closed microswitch or similar switch 50 engages the adjacent end of slide 3 and opens the switch. This switch is fastened to slide 47 in such a position that the switch opens the circuit in which it is connected after a short movement of the slide in the direction described.

Rack 51 is fastened to slide 47 and is meshed with pinion 52 which is fixed to shaft 53 having bearing in block 54 fastened to plate 1 and in housing 55 which contains a clutch or gear system which may be operated by handle 56 to cause shaft 53 to drive the rotor of step motor 59 and connected driving clutch member 57 or to disconnect shaft 53 from clutch member 57, as desired. This clutch is an overrunning type similar to clutch 32—33 and has driven member 58 which may be rotated in the direction of its arrow but is prevented from rotating in opposite direction by means of locking balls, rollers or the like in conjunction with cam surfaces. As before, a brake may be used to prevent driven element 58 from floating or spinning. While clutch 32—33 is indicated, it is possible to use magnetic clutches which can be engaged or disengaged by means of electrical current, thereby making it possible to clutch and declutch with little if any lost motion. The ball or roller type overrunning clutch may have slight lost motion between various operations unless care is taken in the clutch design to prevent this. Any suitable type of ratchet action may be used in place of the clutch if no undesirable lost motion results.

Motor 59 is a step motor similar to those described in my U.S. Patents Numbers 2,774,922; 2,782,354; 2,787,719, and 2,806,987. The rotor of this motor moves one step each time the control circuit contained in cabinet 60 is intermittently energized by a pulse in transformer secondary winding 61 which is associated with transformer primary winding 62. The circuit contained in cabinet 60 will be described later.

Driven element 58 of clutch 57—58 is fastened to the shaft of roller 63 which is placed beneath belt or tape 64 to drive it. Small wheels or rollers 65 are rotatably attached to arms 66 which are pivoted at 67 to frame plates 68 of the tape device. These members are attached to plate 1 and have bearings supporting the shaft of roller 63 for rotation as well as the shafts of tape supply reel 69 and take-up reel 70. Pulley 71 is attached to the shaft of the latter reel and somewhat larger pulley 72 is fastened to the shaft of drive roller 63. A belt 73 connects the two pulleys and may be of elastic type so that the belt may slip when reel 70 has stretched the belt or tape taut. Any suitable guides or rollers may be used to keep the belt in desired locations for recording. The weight of rollers 65 may be made sufficient to cause roller 63 to drive the tape in the direction of arrow A or springs may be used to force the rollers yieldingly against the tape. It is obvious that the edge portions of the tape may be perforated and a sprocket may be used to drive the tape instead of roller 63.

Recording heads 74, 75, 76, 77, 78, and 79 are suitably mounted above tape 64 and have a terminal of each connected to negative line 80. These may be magnetic recording heads, solenoid-operated punches, or other recording means. If punches are used a perforated plate will be placed beneath the tape, the plate having holes aligned to receive the punches. For convenience it will be assumed that the recording devices are magnetic recording heads. The remaining terminal of recording head 79 is electrically connected to contact 80a of double pole reversing switch 83a, the blade 87a of which is connected to conductor 83 and to blade 81 of switch 82. The remaining terminal of recording head 77 is connected to contact 85a of switch 83a and blade 86a of the switch is adapted to engage contact 85a. Blade 86a is connected to contact 85 of switch 82 by means of conductor 84.

Contact 88a is connected to head 77 and contact 89a is connected to head 79. With switch 83a in the position shown, switch blade 81 and conductor 83 are connected to head 79 and contacts 85 and 171 are connected to head 77 through conductor 84. It is obvious that if switch blade 86a is swung over to contact 89a and if blade 87a is swung over to contact 88a, then conductor 83 will be connected with recording head 77 and conductor 84 will be connected with recording head 79. These two switch blades may be mechanically connected by means of insulation material so that they will move in unison. Therefore either commutator 9 or 37 may be connected with either recording head 77 or 79. Since commutator 9 will always be used to provide the maximum number of coordinate pulses for any angle at which arm 13 is set, this commutator will produce X-axis pulses in one case and Y-axis pulses in some other case. Since head 77 always records X-axis pulses and since head 79 always records Y-axis pulses, the commutators can be properly connected by throwing switch 83a to the desired position.

Assuming that it is desired to make a tape to control a machine having a table or other elements movable along coordinate paths at right angles, head 79 will record characterizations, spots, or pulses representing digital or step movements of one of my step motors on the machine along one axis and head 77 will record characterizations, pulses, or spots representing another of my step motors on the machine and adapted to cause digital or step movement of the table or other member along an axis at right angles to the other axis. If it is desired to include in the tape a representation of a third step motor to cause movement of a tool or other element along an axis at right angles to the other two axes then recording head 75 can be pulsed in desired manner.

Head 78 is used to record a line of magnetized tape for controlling the brake of the step motor the speed of which will be determined by the spacing of "spots" or pulses recorded by head 79. Element 86 connected in series with recording head 78 may be a vibrator or chopper of any suitable type and designed to cause intermittent energization of head 78 so that separated areas or spots of magnetism will be produced in tape 64 rather than a continuous magnetic line. The separated spots may be more effective with usual types of magnetic pickups than a more or less uniform magnetic line, although the latter can be used. When it is desired to make brake magnetic head 86 effective, switch 87 leading to positive line 88 is closed. The positive line 88 and negative line 80 are connected to the respective positive and negative terminals of a direct current generator, filtered rectifier, battery, or other source of direct current.

Recording head 76 is for recording magnetic spots for controlling the brake associated with the step motor, the speed of which is controlled by the magnetized spots or areas produced by head 77. Chopper or other current interrupting element 89 is similar in design and purpose to element 86 and may be made effective by closing connected switch 90 leading to positive line 88. Chopper 91, connected with recording head 74 and associated with head 75, may be made effective by closing switch 92 leading to positive line 88. If desired, the brake-controlling heads 74, 76, and 78 may be connected to alternating current or pulsed current and the separate choppers 91, 89, and 86 could then be eliminated.

Switch blade 93 is connected with conductor 94, one end of which is connected to a contact of switch 95, the blade of which is connected to brush 40 by conductor 96. The other end of conductor 94 is connected to contact 97 of switch 82, which contact is adapted to be engaged by blade 98 of the switch. Conductor 94 is also connected to a contact of switch 99, the blade of which is connected by conductor 100 to brush 101 yieldingly pressed against commutator 102 which is fixed to shaft 103 with insulation material intervening. Shaft 103 is rotatable in a bearing or bearings in plate 104 fastened to guide 105 through which rack 106 is slidable. Slip ring 107 is fastened to the insulating material 108, coaxial with shaft 103, and is electrically connected with the bars or other peripheral contact elements of commutator 102. Brush 109 is yieldingly pressed against slip ring 107 and is connected to positive line 88 as indicated. Pinion 110 is attached to shaft 103 and is meshed with gear 111 attached to shaft 112 which is rotatable in bearings in plate 104. This shaft also carries attached pinion 113 which is meshed with rack 106 which is suitably guided by member 105 through which the rack may be moved.

Blade 114 of switch 82 is electrically connected with one terminal of electrical or electromagnetic counter 115, the other terminal of which is connected to one contact of normally closed microswitch or similar switch 50 which is fastened to slide 47. The other contact or terminal of this switch is connected to a terminal of the transformer primary winding 62. The remaining terminal of this primary winding is connected to switch blade 98. Motor 116 is mounted on plate 1 and is shown as a direct current motor having its field winding connected to a source of direct current through conductors 117. Its armature winding is connected to the same direct current source through conductors 119 and reversing switch 120. The direct current source, which may be that connected to lines 88 and 80, is connected to reversing switch 120 through conductors 118. Switch 121 is connected in the armature circuit to make motor 116 operative when desired and ineffective at other times. The field circuit could likewise be controlled by a switch if desired. Motor 116 could be any type of reversible motor, either alternating current or direct current. It is desirable that the motor rotate at fairly uniform speed. Shaft 53 supports the rotor of this motor or is attached thereto so that pinion 52, this rotor, and the driven clutch member 122 will rotate together. Driving member 123 of the clutch is fastened to short shaft 124 having rotational bearing in post 125 rising from plate 1. Pulley 126 is attached to the other end of this shaft and is operatively connected to pulley 127 of the same diameter by means of belt 128. While pulleys are shown, sprockets and a chain, or gears, may be employed to cause shaft 129 carrying pulley 127 to cause rotation of shaft 53 at the same speed, preferably. Clutch 122—123 may be a mechanical, electrical, or magnetic type, as desired, and may be made effective or de-clutched at will.

Operating arm 130 of reversing switch 120 is pivoted to link 131 which is pivoted to arm 132 hinged or pivoted to post 133 extending from plate 1. The pivot radius of arm 132 is preferably the same as that of arm 130. Lug 134 on rack member 51 near its end is arranged so that it will strike the end portion of arm 132 when rack 51 is near the end of its travel in one direction thereby rotating arm 132 clockwise through an angle and simultaneously rotating switch arm 130 clockwise through substantially the same angle through the agency of link member 131. The movement of arm 130 actuates the reversing switch and thereby causes motor 116 to reverse, if switch 121 is closed. The pinion 52 rotated by shaft 53 drives rack 51 in a direction depending upon the direction of rotation of motor 116. When rack 51 carries lug 134 toward arm 130 until the lug strikes this arm it will be turned with the switch operating shaft until the switch is again reversed, thereby causing motor 116 to reverse and to drive rack 51 in opposite direction until lug 134 strikes arm 132 again, in the position shown. The switch 120 may be a snap type if desired. It will be seen therefore that when switch 121 is closed motor 116 will be repeatedly reversed to drive rack 51 and attached slide 47 back and forth on bar 3 through a predetermined distance. If it is desired that motor 116 should rotate in the same direction, reversing switch 120 could be connected to a solenoid-operated reversing gear device so that reversal of direction of movement of rack 51 will occur when the gear system is reversed. For instance, the unit 55 could be an electromagnetic reversing gear device controlled by current from switch 120.

The gear system can be arranged to return the rack along its non-effective stroke at a faster rate than during its effective stroke. Various means may be used to cause reciprocating movement of rack 51. For example, two or more magnetic clutches associated with suitable gearing may be energized alternately; or a solenoid may be used to retract the rack and a spring or weight may be employed to move it at uniform speed in its effective direction, under control of a clockwork escapement or other speed regulating device such as a flyball friction governor. A rotated cam may also be used to move the rack along its effective stroke against spring tension which will cause the rack to be quickly returned to starting position at the end of the cam.

Figure 2, shown in fragmentary manner, illustrates the spring and governor construction. Gear 135 and attached ratchet wheel 136 are fixed to shaft 53, the pawl 137 being pivoted to arm 138 attached to shaft 53. This pawl drives ratchet wheel 136 and gear 135 when shaft 53 is rotated in clockwise direction as viewed from the right, but the pawl slips over the ratchet wheel when shaft 53 is rotated in opposite direction. Gear 135 is meshed with pinion 139 attached to larger gear 140 which, in turn, drives pinion 141 attached to toothed wheel 142 which is limited in speed of rotation by cooperating oscillated verge 143. Suitable bearings for the gears and verge are provided. Spiral type spring 144 in housing 145 urges rotation of pulley 146 fastened to a shaft which is rotatable in bearings in housing 145 attached to plate 1. One end of the spring is attached to pulley shaft 147 and the other end to housing 145. Pulley 146 is connected with rack 51 by means of flexible cord 148 which is wrapped around the pulley when it is rotated to pull rack 51 towards it during the effective stroke of the rack which results in pawl 137 rotating the escapement mechanism to regulate the speed of movement of the rack to a more or less uniform value. A falling weight could be used in place of the spring if very accurate speed control is desired.

Solenoid 149 is attached to plate 1 and its plunger 150 is fastened to ear 151 on rack 51 by means of cord, wire, or rod 152. This solenoid is long enough to pull the rack through its full non-operative or return stroke when energized. When this happens the pawl 137 slips over ratchet wheel 136 and the escapement or speed regulator does not offer a resisting effect. The solenoid can, therefore, very quickly return the rack to effective starting position. On the non-effective or return stroke the element 49 of microswitch 50 is pushed against sleeve 3 and the recording circuit is opened. For this modification the switch 120 may be a simple single pole switch with contact 153 connected by conductor 154 to a source of current and arm 130a is extended beyond the pivot to make contact with element 153 when arm 132 is struck by lug 134 on the rack. Switch element 130a may be electrically insulated from arm 130 and is connected with one terminal of solenoid 149, the other terminal of which is connected with the other conductor 155 of the source of current. When switch 120 is opened as a result of lug 134 striking arm 130, the solenoid is deenergized and spring 144 pulls rack 51 in effective direction at substantially uniform rate and when lug 134 strikes arm 132 and causes link 131 to rotate arm 130 to close the switch the solenoid is quickly energized to return the rack on its non-effective stroke as described. The solenoid should be sufficiently strong to overcome the pull of the spring. A suitable dashpot or other device may be used to limit the speed of operation of the solenoid, if desired. Motor 116 may be used for the return stroke in place of the solenoid, or a rotary type solenoid may be employed.

Reverting to Figure 1, rack bar 156 is suitably guided to move through an opening in member 54 along an axis perpendicular to the axis of movement of rack bar 106. Guide member 54 is fixed to plate 1 and rack 156 is rigidly attached to sleeve-like guide 105 through which rack 106 may be moved. Rack 156 engages pinion 157 which is fastened to gear 158 and to shaft 159 which is rotatable in a bearing or bearings in plate 1 or in a post extending from it. Shaft 160 is similarly supported for rotation and carries slip ring 161 and commutator 162, the metallic bars or contacts of which are connected to the slip ring by conductors as indicated by the dotted lines. The slip rings of commutators 9 and 102 are similarly connected to the respective commutator bars. Brush 163 engages slip ring 161 and brush 164 engages commutator 162. Brush 163 is connected to positive lines 88 and brush 164 may be connected with conductor 165 by closing switch 166. Conductor 165 is connected to contact 167 adapted to be engaged by switch blade 81, and to contact 168 adapted to be engaged by switch blade 98. Conductor 165 is also connected with the blade of switch 169, the contact 170 of which is connected with brush 10. Contact 171 is connected with conductor 84 and is adapted to be engaged by switch blade 93. Contact 172 is connected with conductor 83 and is adapted to be engaged by switch blade 114.

It will be observed that rack 4 drives the commutator shaft pinion directly and not through step-up gearing as used in connection with racks 156 and 106. A similar step-up gear system may be used in conjunction with rack 4, or commutator 9 may be made sufficiently large, and with an adequate number of contacts or bars, to provide the desired accuracy or number of contacts for a given displacement of the commutator. It is desirable to keep the step-up ratio reasonably low.

Tape drive unit 173 is similar to the unit for tape 64, like parts being designated with like numerals. Two drive rollers 63 and 63a are provided in this case along with two take-up reels 70 and 69. Pulleys 72 and 71 serve the same purpose as in the other unit and similar pulleys 72a and 71a, in conjunction with belt 73a, serve to rotate reel 69 sufficiently to take up the tape 64a when handle 174 is turned in proper direction. Handle 174 is fastened to the shaft of drive roller 63a and handle 175 is fastened to the shaft of drive roller 63. The belt or tape 64 may be moved in the direction of arrow B by turning handle 174 in proper direction and the tape may be moved in the direction of arrow $C_1$ by turning handle 175 in proper direction. These rollers could of course be motor-driven. In either case, the tape will be taken up on one take-up reel or the other, according to which handle is turned.

Magnetic heads 74a, 75a, 76a, 77a, 78a, and 79a, are magnetic pick-ups and may be similar to heads 74, 75, 76, 77, 78, and 79. The spacing of the two groups of heads with respect to the tape and with respect to each other may be the same but is not necessarily identical. Tape 64a could be perforated, in which case heads 74a to 79a would be photocells or similar radiation-sensitive means in conjunction with suitable illumination which would be modulated by the moving perforated tape before the light reaches the photocells. Brushes could be used, or similar contacts, in order to open and close the circuits for energizing heads or punches 74 to 79 in accordance with the patterns of perforations of tape 64a. For illustration we will assume that both groups of heads, 74 to 79, and 74a to 79a, are magnetic and that tapes 64 and 64a are magnetic tapes.

The heads or pick-ups 74a to 79a are suitably supported above tape 64a and each has one terminal connected to positive line 88. The remaining terminals of these pick-ups are connected to input terminals 176 of amplifier 177, the output terminals 178 of which are connected to contacts 179 of switch 180. The blades of this switch are connected to the positive terminals of respective recording heads 74 to 79, as indicated by arrows. Current is supplied to the amplifier through conductors 181. The amplifier may be of any suitable type. Such circuits are well known and do not require detailed description. When switch 180 is closed, therefore, amplified pulses from pick-ups 74a to 79a will be conducted to respective recording heads 74 to 79, assuming that tape 64a has a pattern of magnetic spots or areas aligned to influence the pick-ups when the belt or tape 64a is moved. Negative line 80 will of course be in circuit.

Pick-up 79a will cause head 79 to transfer pulses to tape 64 to control the speed of one step motor and pick-up 77a will cause head 77 to transfer pulses to tape 64 to control the speed of a second step motor. Pick-ups 78a and 76a will transfer pulses to respective heads 78 and 76 to control the reversing of brakes of the respective two motors when magnetized areas are placed on tape 64a to cause energization of one or more brake operating solenoids or other electromagnetic devices.

Curves C, D, and E, of any desired configuration, are drawn or otherwise placed on sheet or board 182 which may be attached to plate 1 or it may be a relatively large board with curves drawn on an enlarged scale, for accuracy. These curves are designated by the respective letters C, D, and E and are numbered along the curves as indicated. The spaces may be subdivided into as many graduations as desired. Points of change of curvature such as the intersection of line MM with curve C may be marked with a line as indicated, or different colored ink or a line of different character may be used to indicate the point of change of curvature. Similarly, the different curves may be drawn or printed in ink of different color and the section of tape 64a corresponding to that curve can be of the same color or can have marks of that color. These and other curves may be placed on an elongated belt which may be wound on and unwound from reels in order to bring to view the sections or portions of the curves which are desired.

The tape 64a is provided with magnetic or other spots or holes carefully spaced in order to represent the associated curve, considering that two step motors causing movement of a machine member or other member of any kind will cause the member or a point thereof to move through a path substantially identical with the curve if controlled by a tape having characteristics or spots identically or proportionally spaced as compared to those of tape 64a, for the particular curve under consideration. The tape 64a should be lettered to correspond to the curves on the drawing and should be numbered correspondingly so that any portion of any one of the curves can be readily picked out on the tape. The various curves may be represented by spots or characterizations which represent the X and Y coordinates and the magnetized spots or characterizations for any one curve may be placed on one linear section of the tape; or the tape may be wide enough to carry the magnetized areas of a plurality of curves in parallel rows, each row being suitably marked and numbered. In the latter case, the pick-ups may be shifted laterally or additional pick-ups may be employed, one for each track; in conjunction with switches to cut in the group desired.

The mechanism driving tape 64, as a result of turning one or the other of handles 174 and 175, may be arranged so that both tapes will be driven at the same speed, in which case the distances between corresponding spots or areas will be the same for each tape. If, however, it is desired to space the spots or areas further apart on tape 64a, for ease of identification, then a proportionally reduced drive ratio may be employed so that tape 64 will be moved at less speed than tape 64a.

Disc 183 is fastened to plate 1 and has scale 184 around its circumference. This scale is preferably divided into divisions representing degrees and fractions of degrees. If desired, it may be marked in degrees, minutes, and seconds. A magnifying lens, or other enlarging means similar to that employed with scale 18 may be used in order to read fractions of degrees accurately. Radius arm 185 is fastened to gear 193 beneath it and is rotatable with this gear and perpendicularly arranged stub shaft 186 fastened thereto. This shaft is rotatable in suitable bearings fastened to plate 1. This arm has edge portions 187 and 188 and slot or track 189 in which slide 190 is radially movable. The slot and slide may be dovetailed so that the slide will not fall out of the track. Thumbscrew 191 is threaded into a hole in slide 190 and may be turned to lock the slide in position relative to arm 185 or any other suitable type of lock may be used. Pointer 192 is attached to arm 185 and is movable with reference to scale 184 to indicate the angle which the axis of arm 185 makes with reference to the horizontal or X-axis of the scale.

Pinion 194 is fastened to stub shaft 195 which is rotatable in bearings in plate 1. Handle 196 is attached to the upper face of pinion 194 and may be used to rotate this pinion and cooperating gear 193 which in turn rotates arm 185 around the axis of shaft 186. Rack 106 has end portion 197 which is attached to slide 190 on the radial axis thereof by pivot 198.

The circuit contained in cabinet or housing 60 is shown in Figure 3 in conjunction with step motor 59 which the circuit controls. This motor is similar to that described in my application Serial Number 295,694, filed June 20, 1952. This motor has three stator sections or phases; 199, 200, and 201 and three respective cooperating rotor units; 202, 203, and 204 which are not wound. There are preferably an equal number of stator and rotor teeth or poles in each phase or section and the teeth of the rotors or stators, as preferred, are phased so that if the respective stator windings 205, 206, and 207 are energized in that order, the rotor assembly will rotate, say, in forward direction. If the order of energization is 207, 206, and 205, the rotor assembly will rotate in reverse direction.

The rotors are fastened to shaft 208 which is supported in suitable bearings in end bells 209 and 210. The stator units are separated by spacers, as indicated, and are held together by through bolts 211. The stator windings are arranged so that all the teeth or poles of any one stator are energized simultaneously and the resulting magnetic poles induce opposite magnetic poles in the associated rotor teeth. If then the rotor teeth of any one energized phase are out of register with the associated stator teeth, the rotor teeth will be magnetically pulled into alignment with those stator teeth, and beyond, due to momentum of the rotor. In order to prevent oscillation or back-and-forth swing of the rotor about the aligned or in-register position, an overrunning clutch or one-way brake system is employed. This comprises cam element 212 attached to end bell 210, hard roller 213, and hardened disc 214 which is keyed to shaft 208. A suitable cradle and spring may be used to keep roller 213 yieldingly pressed against the inclined surface of the cam and against the periphery of the disc or wheel 214 so that the roller will pinch and prevent rotation of the disc and rotors in clockwise direction, as viewed from the right, but will allow free rotation in the opposite direction. This reverse lock will prevent backswing of the rotor and makes it possible to energize the sections or phases rapidly in sequence, the rotor moving one step for each energizing pulse or for each shift of energization from one phase to the next.

One end of each of the three stator windings is connected to positive line 88 and the other ends are connected, respectively, to ends of resistors 215, 216, and 217, the other ends of which are connected to the respective anodes of thyratrons 218, 219, and 220. The cathodes of these thyratrons are connected to negative line 80 through resistors 221, 222, and 223, as indicated. Batteries or other potential sources 224, 225, and 226 are connected to the respective cathodes of thyratrons 220, 218, and 219 through resistors 229, 227, and 228, as shown. These bias sources are connected normally to bias the grids of the thyratrons negatively to prevent firing of the tubes. Condensers 230, 231, and 232 are connected between the positive terminal 233 of resistor 234 and the junctions of resistor 227—battery 225, resistor 228—battery 226, and resistor 229—battery 224. The other terminal of resistor 234 is connected to negative line 80 to which is connected one terminal of transformer secondary winding 61. Quenching condensers 235, 236, and 237 are connected between the anodes of the thyratrons to cause any fired thyratron to be extinguished when any one of the other three thyratrons is fired.

This circuit constitutes a counting circuit and will fire the thyratrons in the order 218, 219, 220 when sequential pulses from transformer winding 61 are applied to resistor 234, the terminal 233 being positive. Therefore the rotor and shaft 208 will rotate one step for each effective pulse from transformer winding 61. The phasing of the rotor teeth or stator teeth is such that the rotation will be counter clockwise as viewed from the right. This causes tape 64 to be driven in the direction of arrow A.

In operation, suppose that it is desired to make a tape which will cause a machine tool automatically to move the axis of the tool through a path or pattern NO'PQRSTN, as illustrated in Figure 5. It is assumed that the machine tool table, tool, or other movable member will be actuated along the X and Y axes by step motors of the general type described, but these motors may be reversed by using a two-way brake system and by reversing the order of energization of the stator windings.

Commutator 9 provides the maximum pulses for causing actuation of the X-axis or Y-axis step motor, according to the angle, and commutator 37 provides pulses for causing actuation of the step motor requiring the minimum number of pulses for the same angle. The maximum angle at which edge 20 will be set will be 45 degrees and so commutator 37 will provide a maximum number of pulses equal to the number of pulses provided by commutator 9. Now assume that straight line NO' is inclined at an angle of 40.5 degrees with respect to the X-axis of Figure 5 and that straight line ST is inclined at an angle of 9.25 degrees with respect to the X-axis; also that line TN is inclined at an angle of 27 degrees with respect to the Y-axis. Assume further that movement of the tool in the direction OX is effected when the X axis motor is rotating in forward direction and that movement of the tool in direction OY is effected when the other step motor is rotating in forward direction. The length of line NO' must be known and this can be translated into the equivalent number of coordinate steps by dividing the longest coordinate component of this line by the tool movement per step for that axis. The longest linear component in this case would be the X axis subtended coordinate, since the the angle of inclination of line NO' with respect to the X axis is less than 45 degrees. The length of the X-axis coordinate of line NO', assuming N as the origin, is the length of this line multiplied by the cosine of 40.5 degrees. Then, knowing the number of steps per revolution of the motor and knowing the drive gear or other ratio, the number of steps required to move the tool through the X-axis component can be easily determined.

Let us assume that 1250 steps are required for the X-axis motor. Then, referring to Figure 1, counter 115 is set for 1250 pulses after which it will automatically open the circuit in which it is connected. Such counters are available commercially and so details will not be described. Next, thumbscrew 21c is loosened and rack 14 is swung about pivot 12 until edge 20 makes an angle of 40.5 degrees with respect to the axis of bar 2 or slide 3. This angle is determined by the position of pointer 17 with reference to scale 18. Then thumbscrew 21c is tightened to clamp rack 14 in the set position and rack 51 is placed at its predetermined starting position, preferably with one of the bars of commutator 9 just out of contact with brush 10. Then switches 95 and 169 are closed and switches 99 and 166 and 180 are opened. Switch 82 is then closed to the left, with blades 93, 114, and 98 engaging respective contacts 171, 172 and 168 and switch 83a is thrown to the dotted position, resulting in pulses from commutator 9 passing through brush 10, switch 169, conductor 165, contact 168, blade 98, winding 62, switch 50, counter 115, blade 114, contact 172, conductor 83, switch blade 87a, contact 88a and so to X-axis recording head 77. At the same time pulses from commutator 37 will pass through brush 40, conductor 96, switch 95, conductor 94, switch blade 93, contact 171, conductor 84, switch blade 86a, and contact 89a to recording head 79 representing Y-axis pulses in this case. Switch 82 is always thrown to the left when commutators 37 and 9 are used, but switch 83a is in the indicated dotted position when the required number of pulses for the X-axis is greater and the switch is thrown to the right as indicated by solid lines when the required number of pulses for the Y-axis is greater.

Since line NO' represents forward movement of both the X-axis and Y-axis motors of the machine tool, switches 87 and 90, controlling recording of reversing tracks, will remain open in this case. Next, handle 56 is thrown to a position disconnecting shaft 53 from step motor 59 and clutch element 57. It is assumed that the A.C. lines supplying current for the filaments of the tubes in cabinet 60 and the D.C. lines for constant speed motor 116 are connected to suitable current sources. Motor 116 could be a reversible A.C. motor if desired. Finally, switch 121 is closed so that motor 116 starts driving shaft 53. When this happens rack 51 is moved in a direction for hooks 46 to engage ears 48 and to pull slide 3 and rack 4 toward the forward end of bar 2, thereby rotating commutator 9 and causing recording head 77 to receive a pulse of energy each time a bar or contact of commutator 9 passes under brush 10. These pulses are conducted as previously described. Therefore, for each full travel in the effective direction a predetermined number of pulses will be conducted to recording head 77. On return strokes, rod 49 of normally closed switch 50 is pressed against the end of slide 3, opening switch 50 so that pulses from commutator 9 are not recorded during return movements of the slide 3. These return movements are caused by lug 134 striking arm 132 near the end of the working stroke, and through link 131, swinging arm 130 through a clockwise angle to cause switch 120 to reverse the current conducted to the field or armature of motor 116, thereby producing reverse rotation of this motor and reverse movement of rack 51 until lug 134 strikes the end of arm 130 and rotates it through a counter clockwise angle to throw the switch to cause reversal of motor 116 again. Therefore motor 116 will be alternately reversed by switch 120 to cause reciprocation of rack 51.

While slide 3 is being pulled along bar 2 on effective strokes, switch 50 being closed, edge 20 of arm 13 will force rounded rod 21 to the left at a rate depending upon the angle of setting of edge 20 with respect to the axis of travel of slide 3. Therefore the rate of displacement of rod 21 and rack 25 will represent the speed of displacement of the tool along the Y-axis if the rate of displacement of slide 3 and rack 4 represents the speed of the tool along the X-axis. On return strokes spring 43 maintains rod 21 in contact with edge 20 at all times. Rack 25 will rotate pinion 26, gear 29, pinion 30, and driving clutch member 32 in oscillatory manner but, due to the one-way or overrunning clutch construction, the driven member 33 of the clutch is rotated only in the direction of the arrow, brake 45 preventing overtravel. Commutator 37 is therefore rotated by means of attached elements 33 and 34 during effective strokes of slide 3 and arm 13 but not for return strokes during which switch 50 is open. This switch is arranged to be opened before a contact of commutator 9 touches brush 10 on return strokes.

Since commutator 9 is the controlling member and since it is moved through a fixed number of contacts to produce a predetermined number of pulses for each effective stroke, it is necessary to accumulate the full contact displacements and fractions thereof for commutator 37 in order to keep the proportionate number of steps for the angle involved. Hence the overrunning clutch which may be of the ball type, magnetic, or otherwise. If discs are magnetically locked together by electromagnets when the clutch action is desired and automatically released by cutting off current during return strokes there will be little lost motion in the clutch. The ball or roller type overrunning clutches can also be made with little lost motion.

After electromagnetic counter 115 counts the pre-set 1250 pulses it opens the circuit including recording head 77 so that no more pulses are recorded. When this happens the operator can open switch 95 to prevent further recording of pulses by recording head 79 representing Y-axis pulses.

The opening of switch 95, in effect, may be made automatic by the arrangement shown in the fragmentary modification illustrated in Figure 6 in which equivalent parts are given the same numerals as before. In this modification the conductor from brush 40 is connected to contact 115d attached to the counter but insulated therefrom. Flexible contact 115a is attached to button 115c and is connected to the blade of switch 95. The edges of the counting wheels d, e, f, g, project through the casing in this modification and may be rotated to set the counter to the desired value as indicated in the windows. Contact 115b is fastened to counter 115 and is insulated therefrom. A conductor connects this contact with one terminal of relay coil 121a, the other terminal of which is connected to a contact of switch 121d, the blade of which is connected to an A.C. line. The other A.C. line is connected to flexible contact 115e attached to button 115c. When button 115c is pressed down and latched automatically, contacts 115a and 115d close the circuit from brush 40 to switch 95 and when this switch is closed, pulses from commutator 37 are conducted to recording head 79 if switch 83a is in dotted position. When, however, counter 115 is actuated through the pre-set number of counts, 1250 in this case, the latch is automatically released, allowing button 115c to be lifted by the spring and, accordingly, separating contacts 115a and 115d. This opening of the circuit immediately stops the recording by head 79. The latch may be released by the counter rotating a threaded shaft which moves a cooperating threaded element through a sufficient distance to trip the latch after a predetermined number of counts, or by any other suitable mechanism. If desired, switch 121 may be replaced by relay 121b having magnetizing coil 121a connected in circuit with contact 115b on counter 115. Contact 115e is similar to contact 115a and is similarly mounted on element 115c. When button 115c is pushed down and magnetically or otherwise latched, contacts 115a and 115d are closed as described and contacts 115e and 115b are also brought together to energize relay coil 121a, causing relay 121b to be closed, thereby energizing motor 116, assuming switch 121d to be closed. When relay 121a is closed motor 116 is energized and rotates but when button 115c snaps up due to completion of the pre-set count, the circuit to the coil 121a is broken and the coil is de-energized, thereby allowing relay 121b to open under spring action. The pulsing of recording head 79 and the rotation of motor 116 are in this way simultaneously stopped along with the opening of the circuit to recording head 77.

The tape or belt 64 is driven by step motor 59 rotating clutch member 57 which in turn rotates overrunning clutch member 58 in the direction of the arrow but not in opposite direction. The driven clutch member rotates drive roller 63 beneath the tape and, due to spring-pressed or weighted rollers 65, the tape is moved in the direction of arrow A, the take-up reel 70 being driven by belt 73 to keep the tape taut on this reel. Now each time a pulse of current passes through counter 115 and closed switch 50, the current passes through primary winding 62 also and, accordingly, a pulse is induced in secondary winding 61 for each pulse in primary winding 62. These pulses cause the thyratrons in housing 60 to fire in sequence thus causing one step movement of motor 59 for each pulse, as explained in connection with Figure 3. Heavy duty transistors may be used in place of thyratrons. Therefore belt 64 is driven through the same displacement for each count or pulse registered by counter 115. Since this counter is connected in circuit with the recording head which will be pulsed the maximum number of times, the tape will be moved through the required distance. Since the magnetic recording will be faster than the response of the step motor, due to its inertia, the tape may be magnetized largely while it is stationary. If the commutator pulses are made of short duration the recording may be satisfactorily accomplished even while the tape is moving.

Returning to the diagram of Figure 5, the tape 64 has been magnetized in spots in two parallel lines representing line NO'. Now, in order to make the tape representing arc O', P, Q, R, S, thumbscrew 191 is loosened and slide 190 and attached pointer 190a are moved until the pointer is in register with an indication on scale 190b representing the radius of curvature O"O'. In other words, the axis of pivot 198 is set at a radial distance from the axis of shaft 186 equal to radius O"O' and is fastened at that radius by tightening screw 191. Then pointer 192 is set at an angular position relative to scale 184 corresponding to the angular position of point O' with respect to center point O" and X and Y coordinates drawn through this point. After this, switches 99 and 166 are closed and switches 95 and 169 are opened and switch 82 will be thrown to the right since the X-axis pulses from commutator 102 predominate for curve O'P. If the Y axis pulses from commutator 162 were greater in number, switch 82 would be thrown to the left. When commutators 102 and 162 are used, switch 83a remains in the position shown by solid lines. Next, handle 196 is turned in counter clockwise direction until pointer 192 is in register with an angle indication on scale 184 corresponding to the same relative angular position of point P. This movement causes commutator 102 to be rotated through a number of contacts or steps proportional to the required step movements of the X-axis machine tool motor and simultaneously rack 156 is pushed upward through guide 54 to cause rotation of commutator 162 through a number of steps or contacts proportional to the required step movements of the Y-axis machine tool motor in order that the tool shall trace out curve O'P when the two machine tool motors are controlled by the tape.

Rack 106 slides through guide 105 which is moved with rack 156 which passes through fixed guide 54. If desired, commutators 102 and 162 may be adjustable on their shafts so that they can be set at desired zero or starting positions. It will be observed that pulses from X-axis commutator 102 are applied to recording head 77 through conductor 100, switch 99, conductor 94, contact 97, blade 98, primary winding 62, normally closed switch 50, counter 115, blade 114, contact 85, conductor 84 and switch blade 86a. In this case rack 51 is stationary and switch 50 remains closed. Since the angle O"O'P is slightly less than 45 degrees and in the quadrant shown, the X-axis motor will require more steps than the Y axis motor and accordingly switch 82 will be closed to the right. Since, also, the direction of travel is to the right and upward, both machine tool motors will travel in forward direction and switches 87 and 90 will remain open.

Pulses for the Y-axis motor will pass through brush 164, switch 166, conductor 165, contact 167, blade 81, conductor 83, and switch blade 87a to recording head 79. The direction of current travel through winding 62 is the same regardless of direction of closing switch 82. The number of commutator contacts and the associated driving gear ratios can be so chosen that one pulse will represent any desired travel of the recording mechanism or of the machine tool members, say 1/1000 inch per step, or less. The ratio of motor displacement or travel may be increased or reduced with relation to the equivalent travel of the recording mechanism by employing different drive ratios or by using step motors having a different number of steps per revolution as compared to the number of associated commutator contacts. The commutator contacts may be equal to the number of steps per revolution of the associated step motors. It is desirable, generally, that the X-axis and Y-axis step motors move through the same number of steps for equal coordinate displacements. In this case, it is not necessary to count the pulses and so counter 115 may be short circuited by a suitable switch when commutators 102 and 162 are in use. By turning handle 196 until pointer 192 moves through the desired angular spaces, the recording heads 77 and 79 are pulsed in such manner that a magnetic tape is made to control step motors to cause reproduced movement of curve O'P. The tape is driven as before, as a result of pulses from transformer 62—61 being applied to the circuit in housing 60.

The point P is at the intersection of a vertical line through center O″ with the arcuate curve. Therefore the curve turns downward at this point and the Y-axis motor has to reverse, the X-axis motor continuing in forward direction. It will be noticed that again the X-axis component of the curve PQ will have more steps than the Y-axis component and accordingly switch 82 will remain set to the right. The point Q represents the intersection of a 45 degree line through the center of curvature O″ with the arcuate curve. Therefore, in order to add characterizations to tape 64, representing the portion of the curve PQ, the switches remain closed as previously set and switch 87 is closed to cause interrupter 86 to close the circuit to recording head 78 at a rapid rate. This produces a line of closely spaced magnetic spots or characterizations which will cause the Y axis motor to reverse by energizing a relay controlling the brake and simultaneously switching connections of the first and third phase field windings or by switching the grid circuits so that the order of firing the thyratrons will be reversed. This means and method is described in my prior applications Serial Number 295,694, filed June 20, 1952, and Serial Number 497,755, filed March 29, 1955.

After closing switch 87, handle 196 is turned further in counter clockwise direction until pointer 192 is rotated from its 90 degree position at point P, to its 45 degree position at point Q. Again, this rotates commutators 162 and 102 through proportional numbers of steps to represent the respective Y-axis and X-axis displacement of the axis of pivot 198, and recording heads 79 and 77 and will be pulsed accordingly along with the recording of the reversal track for the Y-axis motor. As before, tape 64 will be moved one step in the direction of arrow A each time X-axis recording head 77 is pulsed. This results from pulses in transformer 62—61 triggering the counting circuit in housing 60, as previously described.

After the 45 degree point Q of the curve is reached, the Y-axis will have more steps than the X-axis, in order to reach the point R which represents the intersection of the circular curve with a horizontal line drawn through center O″. Therefore at point Q switch 82 is thrown to the left so that blade 93 is touching contact 171, blade 114 is touching contact 172, and blade 98 is in contact with element 168. This causes the Y-axis pulses from commutator 162 to be connected in circuit with counter 115 and recording head 79, switch 83a being thrown to the solid line position shown. Since the counter is not needed in this case, it may be short circuited. The Y-axis pulses from commutator 162 will cause corresponding step movements of motor 59 and tape 64 and X-axis pulses from commutator 102 will be conducted to recording head 77 through conductor 100, switch 99, conductor 94, blade 93, contact 171, conductor 84, and blade 86a.

If now handle 196 is turned further in counter clockwise direction until pointer 192 is in register with the 0 degree mark of scale 184, the corresponding X-axis and Y-axis pulses will be recorded by respective heads 77 and 79 and the reversing Y-axis line or pulses will continue to be recorded by head 78. The tape 64 will be driven in steps as a result of pulses from Y-axis commutator 162 for this portion of the curve.

For making a record representing the portion of the curve RS, which subtends less than 45 degrees at center point O″, the switch 82 will remain thrown to the left and both switches 87 and 90 will be closed since both the X-axis and Y-axis motors will rotate in reverse direction. Then if handle 196 is rotated in counter clockwise direction until pointer 192 is in register with an angular indication of scale 184, corresponding to the relative angular position of point S, the proper X-axis and Y-axis pulses will be recorded in the manner described and tape 64 will be advanced one step for each Y-axis pulse.

Now, in order to continue making the tape to represent the line ST, switches 99 and 166 are opened and switches 95 and 169 are closed. Switches 87 and 90 will also remain closed since both the X-axis and Y-axis motors of the machine or machine tool to be operated will have to rotate in reverse direction in order to trace out line ST. Since the angle which line ST makes with the X-axis is less than 45 degrees, the X-axis pulses should actuate motor 59 and accordingly switch 83a will be thrown to the dotted position so that pulses from commutator 9 will energize recording head 77. Since switch 82 is always thrown to the left when commutators 37 and 9 are used, pulses from the latter commutator will also activate the motor control circuit in housing 60, causing motor 59 to rotate one step for each X-axis pulse.

Before starting the pulsing, however, thumbscrew 21c is loosened and rack 14 is rotated about pivot 12 until pointer 17 is set at a position relative to scale 18 corresponding to the acute angle which line ST makes with respect to the X-axis. After this setting the thumbscrew is then tightened and counter 115 is set for the required number of X-axis pulses or steps. This number may be determined as before, by taking the total number of pulses necessary for step displacement of a line equal in length to line ST and multiplying this number by the cosine of the angle which line ST makes with the X-axis. After this motor 116 is connected into circuit to rotate at more or less uniform speed so that rack 51 will be reciprocated as previously described, causing commutator 9 to provide pulses for X-axis recording head 77 and causing commutator 37 to provide pulses for Y-axis recording head 79. Since both step motors will rotate in reverse direction, switches 87 and 90 will be closed. After the pre-set number of pulses occur, the counter 115 automatically opens the circuit in which it is connected and can be made to open the circuits to both recording heads and to motor 116, as described.

The final leg of the pattern, line TN, makes an angle of 27 degrees with respect to the Y-axis and, accordingly, there will be more Y-axis pulses or steps than X-axis pulses. For this reason the controlling pulses from commutator 9 should be conducted to recording head 79 and so switch 83a will be closed as indicated by the solid lines. Since the direction of line TN is away from the X-axis and toward the Y-axis, the X-axis motor will rotate in reverse direction and the Y-axis motor will rotate in forward direction. Therefore switch 90 will be closed and switch 87 will be opened. The other switches remain as previously set. Then pointer 17 is fastened in a position indicating an angle of 27 degrees and racks 51 and 4 are placed in starting position, as usual. The number of Y-axis pulses required is calculated by multiplying the number of steps displacement in line TN by the cosine of 27 degrees and counter 115 is set for this number of Y-axis pulses or steps. Again motor 116 is energized and the operation is as previously described, until the counter breaks the circuit, or circuits as desired. The motor 59 is moved one step for each Y-axis pulse reflected in transformer 62—61 and so tape 64 is moved step by step as previously described. The X-axis pulses are produced on a proportionate basis by commutator 37 and are applied to recording head 77. This commutator may also be set at predetermined starting position at the beginning of each new straight line. The recording of pulses related to line TN completes the tape.

The tape maker described so far is a very convenient and rapid device for making tapes representing movement along straight lines at any angles and along circular paths of any arcuate lengths within the capabilities of the machine, and in any quadrant or portion thereof.

The device may be quickly set for a wide range of radii of curvature. An outstanding feature of the device is that relatively complicated shapes comprising straight lines of varied lengths and arcs of circles of varied radius and extent can be represented by a tape or other record, with a minimum of calculations. Further, a very important feature is that the operation is so simple that relatively untrained personnel can learn to use the tape maker in a short time. A further advantage is that the step motors which are finally controlled by a tape, will, due to the momentum of their rotors, cause movement along curved paths when that is called for, rather than along short straight lines as in some other control systems.

When it is desired to make tapes reperesenting irregular curves, the curves shown on sheet or plate 182 may be used. The curve desired is drawn on a transparent or translucent sheet of paper, plastic, or the like, and is matched to portions of one or more of curves C, D, or E, in much the same manner in which a French curve is used. These curves may be drawn on an enlarged scale and a suitable magnifying viewer may be employed. Likewise, paper or plastic templates may be cut out, if desired, and matched against the above curves. Let us assume that the first portion of the desired curve matches the portion of curve D lying between the numbered points 35 and 71. Then handle 56 is thrown to the left to connect shaft 53 with the shaft of motor 59 so that tape 64 can be driven in the direction of arrow A at the same time that master tape 64a is driven in the direction of arrow C, by turning handle 175. As previously explained, the two tapes can be driven at the same or at different speeds. We will assume, for the present case, that the two tape speeds are the same. Then switch 180 is closed and switches 169, 166, 121, 95, and 99 are opened. Switch 83a may be opened if the associated connections from switch 180 are carried directly to the recording heads 74, 75, 76, 77, 78, and 79.

Now, handle 174 may be turned to move the tape 64a in the direction of arrow B and handle 175 may be turned to move the tape in the direction of arrow C. The tape is shifted in one direction or the other until the desired section is indicated by the letter D on the margin and the tape is then moved until the number 35 of section D is opposite index mark $M_1$ on plate 68 slightly rearward of the line of pick-ups 74a to 79a or in some other suitable location. Then handle 175 is turned in a direction to carry tape 64a in the direction $C_1$ and the magnetic pick-ups sense the tape and are intermittently energized by the magnetic spots representing pulses for causing step movements of the two step motors which would move the tool along a curved path identical with the curve D from point 35 to point 71. These numbers are indicated on tape 64a.

The pulses picked up by heads 77a and 79a for controlling the respective X-axis and Y-axis motors are amplified in the circuit in housing 177 and are then transmitted to respective associated recording heads 77 and 79 which record equivalent pulses on tape 64 which is driven in the direction of arrow A by the belts, pulleys, and shafts shown, as tape 64a is driven in direction as indicated by arrow $C_1$. It is obvious that the pulses recorded on tape 64 will be spaced in proportion to the spacing of the magnetized spots on tape 64a.

In curve D, from point 35 to point 71, both the X-axis and Y-axis step motors to be controlled will rotate in forward direction in duplicating this portion of the curve. Therefore pick-ups 76a and 78a will not be energized by any magnetic spots for that portion of the tape. In cases where motor reversal is required, however, tape 64a will carry the necessary magnetized spots. The numbers for identifying various portions of the master tape may be printed along one edge of the tape, with suitable graduations or indexing marks, and the letters indicating the particular curve of sheet 182 being used may be printed along the opposite edge. When the tape 64a has been moved until the mark D-71 has reached index mark $M_1$ or has passed it, a record will have been made on tape 64 corresponding to that portion of curve D. The positive and negative lines of the system will, of course, be connected as usual. Similarly, other portions of the desired curve may be matched to other sections of any one of the curves C, D, or E, and a record on tape 64 may be likewise made. The several portions, if several are necessary, will make up the complete, desired, curve, both for the X-axis and Y-axis motors and for the reversing means when reversal is necessary. The master tape may be prepared by magnetizing it in spots, according to calculated values or by means of a tape maker as described in my application Serial Number 373,187, filed August 10, 1953. It is obvious that tracks for affecting pick-ups 74a and 75a may be employed on tape 64a for a third motor.

This combination tape maker by which tapes representing straight line movement at angles, circular displacement, and various curves, is an unusually convenient device for making tapes in a simple, practical way for controlling machine tools or other mechanisms. It has long been needed in the field of record-controlled operations of various kinds and in conjunction with my step motors, offers a virtually complete, easily learned, and readily operated automatic control system which can be used by operators of average knowledge and training.

A modification of the tape maker for angles is illustrated in partial manner in Figure 4. In this case commutator 238 and associated slip ring 239 are similar to commutator 37 and slip ring 34 and are rotatable between fixed guides 240 by means of shaft 241 having groove 242 in which a key on the commutator is slidable. Flange 243 is integral with shaft 241 and is engaged on either face by yoke 244 integral with bar 245 which is slidable in a rectangular cut-out in fixed bearing block 246. A suitable scale 248 is marked on bar 245. Shaft 241 is rotatable and slidable in a bearing in block 246 and carries attached drive wheel 249 which preferably has a rather narrow edge. This wheel may be made of rubber, metal, or other suitable material and is in contact with a face of disc 250 which is attached to shaft 251. This shaft is rotatable in fixed bearings 252 and carries gear 253 and collar 254. Motor 255 has gear 256 attached to its shaft and meshed with gear 253. Drive wheel 257 is similar to wheel 249 and is in contact with the opposite face of disc 250. Wheel 257 is attached to shaft 253 which is rotatable and slidable in a bearing in block 259. This shaft is similar to shaft 241 and has groove 260 which is slidable past a key in commutator 261 having slip ring 262. Commutators 238 and 261 and associated slip rings may be identical and guides 263 are similar to guides 240. Flange 264 on shaft 258 is engaged by yoke 265 of bar 266 so that shaft 258 may be shifted to place wheel 257 at any desired radius relative to disc 250. Bar 264 has scale 265 and may be fastened in any desired position by thumbscrew 266.

If commutators 238 and 261 are connected in place of commutators 37 and 9, a tape representing movement of two step motors at any desired angle may be made by energizing motor 255 to drive commutators 238 and 261 at proportionate speeds necessary to make the angle desired. These speeds will be in proportion to the X-axis and Y-axis components of the speed desired at the angle desired. The direction, as before, will be determined by opening or closing switches 87 and 90. It is obvious that a third adjustable commutator can be driven by disc 250 to take care of movement along a third dimension. The speeds of rotation of wheels 249 and 257 will be in proportion to the settings of scales 245 and 264 with respect to blocks 246 and 259. The wheels and disc may have rubber or other non-slip surfaces or they may be magnetized for the same purpose. Two oscillators set at different frequencies may be used also to provide pulses representing angular movement of a member driven by step motors. If the frequencies are equal, and the drive ratios and steps per revolution of the motors are equal, then the angle produced will be 45 degrees.

As shown in Figure 7, a tape for third dimensional movements may be made by adding another pivoted bar or arm to the device of Figure 1. Like parts are given similar numerals as before but the additional third dimensional mechanism is generally indicated by the subscript "a." For simplicity, the amplifying system is not shown but arms 13 and 13a, pivoted at 12 and 12a to lugs on slide 3 are shown as pointed and movable relative to angle scales 18 and 18a attached to slide 3. The screws 21c and 21d may be tightened to pull clamps beneath arms 13 and 13a up against members 18 and 18a to lock the arms 13 and 13a in desired positions. The rounded rods 21 and 21a move respective racks 25 and 25a which drive commutators to provide pulses in similar manner, as described in connection with Figure 1. Two switches 50 and 50a may be likewise similarly connected. The arm 13 is set at the angle desired for two axes and the arm 13a is set at the second angle of movement desired for third dimensional operation pulses provided by the commutator (not shown) associated with rack 25a are applied to recording head 75. As before, the commutator driven by rack 4 will be selected to produce the maximum number of pulses for a linear displacement. By this construction a tape representing a line inclined with respect to three mutually perpendicular axes can be readily made.

It is not essential that the arm 13 be straight since it could be in the form of a rotary cam which could be an adjustable helix. Then the rotating helix will move rod 21 and will let the spring 43 (Figure 1) suddenly flip it back to starting position as the high part of the cam passes rod 21.

Figure 8 shows mechanism for causing both strokes of slide 3 of Figure 1 to be effective. Like parts are designated by similar numerals as used in connection with the device of Figure 1. In this case the equivalent parts are indicated by the same numeral as before, or, a similar numeral with the subscript "b." Block 11b is integral with slide 3 and has arms 13 and 13b pivoted to it at 12 and 12b. The ends of arms 13 and 13b may be shaped into cooperating gear teeth concentric with the pivots, as indicated, and of the same pitch diameter so that the arms will move through the same angles, in unison. These gear teeth are not essential, however.

Arm 13 has integral arm 14c with slot 267 concentric with pivot 12. Thumbscrew 21c passes through slot 267 and may be screwed into a threaded hole in slide 3 so that arm 14c and edge 20 may be fastened in any desired angular position. Scale 18c representing inclination of edge 20 of arm 13 and edge 20b of arm 13b is marked on arm 14c and may be set with respect to index indicator 268 on slide 3. A similar scale may be placed on arm 14b which may be adjusted with respect to index 269 on slide 3. Arm 14b, integral with arm 13b, has slot 267b concentric with pivot 12b. If screws 21c and 21b are loosened, edges 20 and 20b may be set at a desired angle with respect to the axis of slide 3 and may be fastened to the slide at that angle by tightening the screws. Serrations or any other means may be used to prevent slippage.

Rack 25 has attached rod 21, as before, and is slidable in or on a suitable track not shown. It is understood that rack 25 and similar rack 25b having attached rod 21b, are slidable in tracks supported by a plate or other member, in generally similar fashion to that illustrated in Figure 1. It is further understood that bearing blocks or other fixed means will be integral with or attached to the above mentioned plate or other member and that shafts are mounted in suitable bearings for rotation. Bar 2 is mounted as previously described and rack 51 attached to slide 3 cooperates with a gear similar to gear 52 of Figure 1, to be reciprocated by this gear which is rotated in alternately opposite directions by motor 116 (Figure 1) as described.

Commutator 37 and associated slip ring 38 are attached to shaft 35 by means of a key or set screw and driven shell, disc, or cup 33 of overrunning clutch 32—33 is fastened to shaft 35. Gear 30 is attached to driving member 32 of this clutch and this gear and clutch member are freely rotatable on shaft 35 in clockwise direction, as viewed from the shaft end 35a. Collar 270 is fastened to shaft 35 to prevent axial movement of gear 30. The clutch is arranged so that balls, rollers, or other elements will be wedged against driven element 33 to rotate it when clutch member 32 is rotated in counter clockwise direction as viewed from shaft end 35a, but when member 32 is rotated in opposite direction there is no clutch engagement and so member 33 may be freely rotated in the direction of the arrow even though clutch member 32 may be traveling at less speed or may be stationary.

Gear 29 is preferably of larger pitch diameter than gear 30 and is meshed therewith. Gear 29 is fastened to shaft 27 which is rotatable in fixed bearing 28 and which shaft also carries pinion 26 adapted to reciprocate rack 25 which is urged to the right by spring 43 so that rod 21 is yieldingly pressed against surface 20. Clutch 32b—33b is of similar construction to clutch 32—33 and driven member 33b is fastened to shaft 35. Driving member 32b is fastened to gear 30b and both are rotatable around shaft 35. Gears 30b and 29b are meshed and the latter gear is fixed to shaft 27b which is rotatable in fixed bearing 28b. Pinion 26b is fastened to shaft 27b and is meshed with rack 25b to cause reciprocation thereof in or on a suitable track, not shown. Rod 21b attached to rack 25b is engaged by edge 20b of arm 13b and this rod is maintained in yielding contact with edge 20b by means of tension spring 43b attached to the rack and to a fixed support. As in the case of clutch 32—33, driving member 32b will cause rotation of driven member 33b in the direction of its arrow when the former is rotated in counter clockwise direction as viewed from shaft end 35a. If, however, member 32b is driven in the reverse direction or if shaft 35 is rotated in clockwise direction at a faster rate than the rate of rotation of member 32b in the same direction, then no clutching engagement occurs.

Rack 4 on slide 3 is meshed with pinion 5 which is attached to larger gear 271 which is meshed with gear 272 attached to commutator 9 and rotatable therewith. Brush 8 is in contact with slip ring 7 and brush 10 is in contact with commutator 9, as in Figure 1. It is evident that movements of the rack will cause amplified movements of commutator 9. The gear ratios and the number of commutator segments or contacts can be chosen so that each commutator contact with brush 10 will represent any desired displacement of slide 3, say 1/1000 inch.

In operation, if slide 3 and rack 4 are reciprocated by means shown in Figure 1, or in any other suitable manner, edge 20 will, for one direction of movement, force rod 21 to the left and thereby cause clutch member 32 to rotate member 33 and commutator 37 in the direction of the arrow, producing pulses as described in connection with Figure 1. During this reciprocation, edge 20b is moved in the direction of arrow V and spring 43b maintains rod 21b in contact with this edge, simultaneously causing rotation of pinion 26b and clutch member 32b in ineffective or slipping direction relative to member 33b. Upon movement of slide 3 in opposite direction, rod 21b and rack 25b are moved to the left, thereby causing member 32b to rotate member 33b, shaft 35, and commutator 37 in the direction shown by the clutch arrows, producing pulses again from commutator 37. In this case spring 43 maintains rod 21 in contact with edge 20 and clutch element 32 is rotated in non-effective or slipping direction relative to clutch member 33 which is rotated by shaft 35. It will be seen then that commutator 37 is driven in the same direction regardless of the direction of movement of slide 3 and attached arms 13 and 13b. These arms are set and locked at the desired angle before starting the operation. The angle indicating means may have a vernier or amplifying scale means of any suitable type.

By this method of operation both strokes of slide 3 will produce pulses through commutator 37 and partial step displacements thereof are cumulative. Commutator 9 will produce pulses for the other coordinate axis for both directions of movement of slide 3 and, in this case, switch 50 will not be necessary. The other connections will be as shown in Figure 1.

In Figure 9 a device for making a record representing a plurality of circles or arcs of circles is shown. Parts which serve the same purpose as in the device of Figure 1 are designated by the same numerals as in that figure. In the present case, shaft or pivot 186 is extended and is rotatable in fixed bearing block 273. The shaft 275 carrying gear 194 is rotatable in fixed bearing block 1n. Disc 274 is attached to block 273 and has a scale of angles similar to scale 184. Disc or arm 276 is attached to shaft 186 by means of set screw 277 and may be rotated to any desired angular position relative to shaft 186 by moving pointer 278 on disc 276 to the desired angular position and then tightening set screw 277. Disc 276 has track 279 axially aligned with the axis of shaft 186 in similar manner to element 185 and is fastened to the disc. This track may be dovetailed to allow slide 280 to be moved radially along the track and fastened in any desired radial position by means of a screw or other lock 281 in manner similar to that employed in positioning and locking slide 190 in desired radial positions relative to scale 190b. A similar scale is provided on track 279. Pivot pin 282, similar to pin 198, connects slide 280 with rack 283 slidable in guide 284, like rack 106 slides through guide 105. Bar 285, shown in fragmentary manner, has a rack integral therewith in like manner to rack 156 and is slidable in a fixed guide similar to guide 54. Bar and rack 285 and rack 283 are adapted to move along coordinate axes and are arranged to drive suitable commutators or other pulse producing devices (not shown) in manner similar to the operation of commutators 162 and 102.

In operation slide 190 and pointer 192 may be set to provide pulses representing movement around a desired circular arc of one chosen radius and pointer 278 and slide 280 may be set to provide pulses representing movement around a different arc relative to coordinate axes or other reference and of different radius. Then if handle 196 is turned in proper direction, pulses representing both of these arcs, which may be full circles or otherwise, will be simultaneously produced and may be transmitted to suitable recording heads to make a tape representing configuration of an object in three dimensions. Additional dimensions could be taken care of by adding similar means for each additional dimension or axis of movement. If it is desired, for instance, that the rate of rotation of disc 276 be different from the rate of rotation of element 193, then a step-up or step-down gear drive may be employed between shaft 186 and disc 276. This drive may be of ball or disc or other variable ratio type, if desired.

The device illustrated in Figures 10 and 11 is for the purpose of making tapes or other records representing movement along an elliptical path. Rack 286 is slidable through fixed guide 287 and is integral with arm 288 to which apertured guide 289 is fastened, or this guide may be integral with arm 288. Rack 290 is slidable through guide 289 along an axis at right angles to the axis of guide 287. Commutator 291 is mounted to rotate with shaft 292 which is supported for rotation by a suitable bearing or bearings 287a attached to guide 287. Slip ring 293 is electrically connected with the contacts or segments of the commutator and is rotatable with shaft 292 but is insulated therefrom, as are the commutator segments.

Pinion 294 is fastened to shaft 292 and is meshed with rack 286. If desired, there can be a step-up gear train between this rack and the pinion. This commutator serves a function similar to commutator 162 of Figure 1.

Commutator 295 and slip ring 296 are similarly connected and are mounted on shaft 297, having rotational bearing in arm 288. If desired, this arm may have a slotted end portion in which the commutator assembly may be rested. Pinion 298, which drives the commutator, is fastened to shaft 297 and is meshed with rack 290 to be driven thereby. A step-up gear train may also be employed to drive commutator 295. Elongated slot 299 is provided in one wall of guide 289 and a similar slot is provided in the opposite wall to allow pivot pin 300 passing through the right end portion of rack 290 to travel most of the length of guide 289. These slots will not be necessary, however, if rack 286 and guide 289 are placed sufficiently to the left so that they will not be struck by pin 300 or other mechanism.

As indicated in the elevation, Figure 11, pin 300 passes through rack 290 and may be attached thereto. This pin is arranged to rotate or swivel in holes in slides 301 and 307. Slide 301 is movable along bar or frame 303 which has an open space in both the top and bottom surfaces and suitable keyways, dovetails, or the like, may be used to guide this slide although it can be supported by threaded rod 304 extending from the shaft of motor 305 and having a bearing in end element 306 of frame 303. Rotation of motor 305 and shaft 304 will cause slide 301 to move along the frame in one direction or the other, depending upon the direction of rotation of the shaft. A similar slide 307 is guided by bar or frame 308 which may have an open upper surface and closed bottom surface as indicated, thereby providing a trough or sunken track in which the slide may be moved along the bar in either direction by cooperating threaded rod 309 extending from the shaft of motor 310 and being partially supported in a bearing in end piece 311 of bar 308. Motors 305 and 310 may be supported by shelves near the bottom surfaces of bars 303 and 308, as shown in Figure 11. These motors are fastened to the shelves and may be connected to a suitable source of power by means of flexible conductors.

Bar 303 is arranged to rotate or swivel about the axis of pin or stub shaft 312 which is fastened to plate 313 attached to the upper edges of the bar. This pin is rotatable in a bore in slide 314 and may be prevented from falling out of the bore by means of screw 315 which passes through a hole in the upper surface of this slide and is screwed into a threaded hole in pin 312 to predetermined depth, allowing rotation of the pin. Other pivot pins shown may be held in the same way but in most cases the pins will remain in operable position without fastening or limiting screws. Slide 314 is movable along the under surface of bar 316 bent as indicated in Figure 11. This slide may be fastened in any desired position along the bar by loosening thumbscrew 317, moving the slide and then tightening the screw which passes through slot 318 and is threaded into the slide. The foot 316a of angle member 316 and track 321 are fastened to a suitable supporting surface.

Bar or channel 308 has vertical pin 319 attached to its bottom surface and this pin is rotatable in a bore in slide 320 which is slidable in channel 321 which, preferably, has sides sloped to prevent the trapezoidally shaped slide from leaving the track. This pin may also be rotatably fastened to the slide by a screw but this is not essential. The slide may be adjusted relative to linear scale 322 on channel 321 and fastened in desired position by means of screw 323 which is adapted to exert pressure against the bottom wall of track or channel 321. Slide 314 may similarly be set with respect to scale 324 on member 316 and may be fastened by thumbscrew 317. Bar or frame 303 is likewise provided with linear scale 325 and slide 301 may be positioned relative to the scale by rotating threaded rod or screw 304 in the desired direction or a releasing element may be used for quick adjustment. The pitch of this screw will ordinarily be so fine that further locking of slide 301 will not be necessary but it can be locked in position by screw 326 if desired. Linear scale 327 is provided on member 308 and slide 307 may be positioned relative to it by rotating screw 309. This slide may be locked in place, if desired, by adjusting screw 328 but, ordinarily, the feed screw 309 will provide sufficient locking action.

The scales may be marked in inches and fractions of inches or in other manner. The edges of the slides may be used as indexes or pointers may be employed along with magnifying lenses or other amplifying means, if desired. The scales 325 and 327 should be marked to indicate the distances of the axes of respective pins 312 and 319 from the axis of pin 300 and scales 322 and 324 should be marked to indicate the projected or horizontal distance between pins 319 and 312. It will be noticed in Figure 11 that the various arms and tracks are arranged at different levels so that they do not interfere.

Motors 305 and 310 may be step motors of the type described for motor 59 and the circuits contained in connected cabinets 329 and 330 may be similar to the circuit shown in Figure 3. These motors should be reversible however, and if operated at relatively rapid speeds will need brakes to prevent rotor oscillations. The setting of the brakes may be automatically or manually controlled by suitable switching means as described in my previously listed patent applications. If motors 305 and 310 are rotated slowly they may be used without brakes, or with simple frictional dampers for the rotors.

Commutator 331 is fastened to the shaft of motor 305 and brush 332 is spring-pressed against the periphery of the commutator. This brush is guided by slotted block 333 of Bakelite or other insulation material which is attached to the motor. Resilient brush 334 is fastened to block 333 and is pressed against the metal face of the commutator so that the brush is electrically connected with the various equally spaced commutator segments or bars which make intermittent contact with brush 332 as the commutator is rotated. Handle 335 is fastened to the motor shaft and brush 332 is electrically connected with switch 336 which is also connected with conductor 337 leading to the pulse input section of the motor control circuit contained in cabinet 330. Conductor 337 would be connected in similar manner to conductor 338 of Figure 3. Positive line 88 is connected to the motor and to brush 334 so that positive pulses are transmitted along conductor 337 to the circuit controlling motor 310 to cause the latter to rotate in synchronism with the rotation of the shaft of motor 305 and attached commutator 331. This commutator preferably has the same number of contacts or bars as there are steps per revolution in identical motors 305 and 310. Negative line 80 is connected with the circuit in cabinet 329 in the same manner as indicated in Figure 3.

Commutator 339 is similar to commutator 331 and is mounted to rotate with the shaft of motor 310. Brush 340, slidable in a slot in insulating block 341, is spring-pressed against the periphery of commutator 339, and resilient brush 342 is mounted on the bottom plate of channel 308 but is insulated therefrom. This brush is yieldingly pressed against the adjacent metal face of the commutator and is in electrical contact with the commutator bars and with positive line 88. Handle 343 is fastened to the shaft of motor 310 and may be used to revolve the rotor and attached screw 309. This motor is electrically connected with the circuit in cabinet 330 in the same manner in which motor 305 is connected with the circuit in housing 329. Brush 340 is connected with switch 344 which is also connected to conductor 345 leading to the pulse input section of the circuit in housing 329 so that motor 305 can be driven in synchronism with pulses produced by commutator 339 and associated means.

These step motors have desirable characteristics but well known types of self-synchronous motors could be substituted for the step motors. In the latter case, the motors would be connected to a common source of alternating current and the three motor phases of one motor will be connected with the three phases of the other motor. Then if one motor is rotated through an angle the other motor will be rotated through the same angle, within the limits of accuracy of the motors. The motors should be connected however, or the associated screws arranged so that as slide 301 is increasing its distance from pivot pin 312, slide 307 is to the same degree decreasing its distance from pivot pin 319, and vice versa, with the result that the distance of the axis of pin 319 from the axis of pin 300 plus the distance of the axis of pin 312 from the axis of pin 300 is always a predetermined sum. This condition should hold regardless of whether step motors or self-synchronous motors are used and regardless of which motor is controlling. In the latter case it is not necessary to use commutators 331 and 339 and associated brushes. Flexible mechanical means such as cables could be substituted for motors.

Brush 163 is in contact with the slip ring 293 of commutator 291 and brush 164 is in contact with the periphery of this commutator. These brushes are connected through suitable switches with the same conductors as indicated in connection with similarly numbered brushes in Figure 1. Likewise, brush 101 is in contact with the periphery of commutator 295 and brush 109 is in contact with slip ring 296 and these brushes are connected as indicated in Figure 1.

Tension spring 347, shown broken away, is attached to pin 348 on guide 289. Pin 349 is fastened to rack 290 which may be long enough to prevent the pin from striking guide 289 or a suitable slot may be provided for passage of the pin. On the other side of pin 348 the pin 350 is attached to rack 290 and travels in slot 299. One end of spring 347 remains fastened to pin 348 and the other end of the spring is fastened to pin 349 if it is desired to urge rack 290 to the right and is fastened to pin 350 if it is desired to urge the rack to the left. Similarly, tension spring 351 is permanently attached to pin 352 which is fastened to fixed guide 287 and the other end of this spring is fastened to pin 353 attached to rack 286 when it is desired to urge this rack in a direction carrying pin 353 toward guide 287. When it is desired to urge rack 286 in opposite direction, the other end of spring 351 is attached to pin 354 attached to rack 286, as shown.

In operation, the axes of pins 312 and 319 are set apart, as read on scales 322 and 324, a distance equal to the predetermined distance of separation of the foci of the ellipse along the major or X-axis. Then frame 303 is swung about pivot 312 until pin 300 is to the right of pin 312 and in a vertical plane passing through the axes of pins 312 and 319. Next, handle 335 is turned until the distance of separation of the axes of pins 300 and 312 is equal to the desired distance of the ellipse from the axis of pin 312 along the major or X-axis of the ellipse. As previously described, as slide 301 and pin 300 are increased in distance from pin 312, slide 307 and pin 300 are decreased in distance from pin 319, and vice versa, and it is assumed that the motors are now connected to produce this result. If preferred, slides 307 and 301 may have manually operated elements which may be actuated to connect or disconnect the slides from the respective screws 309 and 304 in order quickly to move the slides to desired positions.

In the starting position described, the axes of screws 304 and 309 will be parallel and will lie in the vertical plane previously mentioned. Rack 286 will follow movements of pin 300 to represent Y-axis coordinates of the ellipse 346 and rack 290 will follow movements of pin 300 to represent X-axis coordinates of the ellipse. Now, in the starting position described, the axes of pins 300, 319, and 312 will be in the vertical plane passing through the major axis of the ellipse and if spring 351 is attached to pins 352 and 354, as indicated, the spring tension will help to move the axis of pin 300 along the dotted path of the ellipse, upward and to the left in the direction of arrow $T_1$. If, concomitantly, handle 335 is turned in a direction to cause screw 304 to move slide 301 in a direction to lengthen the distance between pins 300 and 312 and simultaneously through the agency of motor 310 and screw 309 to shorten to the same degree the distance between pins 319 and 300, as previously described, then the axis of pin 300 will follow the elliptical path as indicated by the dotted line 346. While pin 300 is being displaced upward and to the left, rack 286 will rotate commutator 291 through a number of steps or contacts representing the equivalent number of step movements of a step motor controlling movements of a tool or other object parallel with the Y-axis. Simultaneously rack 290 will rotate commutator 295 through a number of contacts or steps representing step movements of a motor controlling displacement of the tool or other object in direction parallel to the X-axis. Therefore electrical pulses will be transmitted through brush 164 to a suitable recording head for Y-axis movements and pulses will be transmitted through brush 101 to a suitable recording head for X-axis movements, according to the circuits shown in Figure 1. The step motors to be controlled may have the number of poles and drive ratio chosen so that one step displacement of the tool or other object will be the same distance along either axis as the displacement of pin 300 parallel to the axis under consideration. This arrangement is not essential, however, unless the reproduced ellipse is to be the same size and configuration as ellipse 346. The arrangement could be such that there would be an enlarging effect, or the opposite.

While manual rotation of motor 305 is described, both motors could be pulsed to rotate electrically. They can be pulsed simultaneously or alternately, as desired. The tension spring 347 may likewise be hooked to pin 350 to assist in the operation, but the major need for either spring will be when pin 300 is near the vertical plane through the major axis. The springs may be hooked and unhooked as needed.

It will be seen that screws 304 and 309 will be revolved in the initial directions until the axis of pin 300 reaches the extreme leftward position intersecting line 355 of the major axis, but at the upper end of the minor axis the movement of rack 286 will be reversed in direction although it will continue to provide pulses through commutator 291, representing Y-axis step movements. Therefore as the rack 286 starts to reverse, the switch 87 of Figure 1 will be closed if the Y-axis pulses are transmitted to recording head 79.

Electro-mechanical or electronic means may be provided automatically to sense direction of movement of racks 286 and 290 and to open or close the brake recording switches 87 and 90 accordingly. These sensing means may be similar to that described in my above mentioned applications or in my application Serial Number 436,653, filed June 14, 1954, or otherwise. It is not difficult though to observe the position of pin 300 and the points of change of curvature if the pin has a hollow center as indicated and is provided with cross hairs enlarging lens and associated sighting means. Then if marks 355 and 356 are placed upon a suitable surface to indicate alignment of the major axis, and if marks 357 and 358 are placed on that surface to indicate alignment of the minor axis, the points of change of curvature may be determined when the intersection of the cross hairs is aligned with the marks. Such viewing devices are known and will not be described in detail, but it is believed that a viewing device of the type described, or the equivalent, is novel when combined with a pivot pin. These marks or indices may comprise elements which are movable along coordinate axes and which may be fastened in desired positions.

After point 357 is reached, the screw 304 is rotated in the same direction as before, as well as screw 309. Before pin 300 reaches line 355, spring 351 is removed from pin 354 and is attached to pin 353 to urge rack 286 in a direction the reverse of that in which the rack was moving during the interval in which pin 300 was being moved from point 356 to point 357. When the axis of pin 300 reaches the extreme left position, the intersection of that pin axis with line 355, then the direction of rotation of both screw 304 and screw 309 will be reversed to shorten the distance between pin 300 and pin 312 and correspondingly to lengthen the distance between pin 300 and pin 319 so that the axis of pin 300 traces out the elliptical path 346 between the intersection point with line 355 and the intersection point with line 356, which completes the ellipse. As before, the racks 286 and 290 follow the coordinate movements of pin 300 and actuate respective commutators 291 and 295 to provide pulses for the Y-axis recording head and the X-axis recording head.

At the intersection of the axis of pin 300 and line 358, the direction of movement of the rack 286 will be reversed and so at this point the Y-axis reversing switch 87, which was closed at the intersection of the axis of pin 300 with line 357, is opened since the direction of travel of the tool or other member to be driven by the Y-axis step motor will be the same as the direction of movement in going from starting line 356 to line 357. The X-axis reversing switch will be closed at the intersection of the axis of pin 300 with line 355 and will remain closed until the ellipse is completed.

Tape 64 can be driven at uniform speed while commutators 291 and 295 are producing pulses to be recorded but if it is desired to use the tape to maximum advantage points like point 359, where Y-axis pulses will be produced at a more rapid rate than X-axis pulses, can be determined and switch 86a—87a can be thrown as previously described, to cause the predominant pulse frequency to govern step movement of the tape. It is not necessary, of course, that a tape representing a full ellipse be made, as any part of an ellipse may be selected and pin 300 may be set accordingly, with respect to scales 325 and 327. Either handle 335 or handle 343 may be rotated in proper direction, or both handles may be turned. The turning of either handle associated with one motor will cause the other motor to rotate in synchronism. As stated, both motors may be electrically driven in unison if desired. When pin 300 reaches line 358, the spring 351 is attached to pin 354 again, or at least before the pin nears its extreme position to the right. Spring 347 may be changed in position, likewise, to assist the movement when desired.

If, in Figure 12, commutator 291 is provided with three phased brushes, 164a, 164b, 164c, and with brush 163 for slip ring 293, and if the brushes are connected to three recording heads 79b, 79c, and 79d, as indicated, then the commutator bars will distribute electrical pulses to the three recording heads in sequence and the order of energization of these heads will be automatically reversed when the direction of rotation of the commutator is reversed. If then a step motor having three phases is controlled by the three recorded tracks, the motor will automatically reverse at the proper times. The brake solenoid can then be automatically actuated for reversal by phase-sensing arrangements described in the above designated patent applications or by an electronic phase-sensing circuit in which the energization of a thyratron or other device controlling current to the brake solenoid or other means is related to the order of energization of the current control devices supplying current to the windings of the motor phases. In generally similar manner, or otherwise, the reversal of motors 305 and 310 may be made automatic for the positions of an ellipse requiring reversal. Likewise, the actuation or non-actuation of the reversing switch or relay for the associated brake recording head may be made automatic.

It is evident that considerable flexibility for making tapes representing ellipses of different dimensions is provided in the device of Figure 10 which is associated with the circuitry of Figure 1. By setting pins 312 and 319 at varying distances and by arranging the initial setting of pin 300 on the major axis at varying distances from pin 312, a large number of different ellipses or part ellipses can be traced out and reproduced in tape form. A further flexibility could be added by having a changeable drive ratio between the racks and the commutators, or commutators with different numbers of contacts can be used. The same broad principles may be employed, although the details may be somewhat changed to make tapes representing other curvatures such as hyperbolas, parabolas, and the like. The same tape may be run through the recorder twice in order to record variations in a third dimension or another device similar to that shown in Figure 10 may be incorporated for third dimensional elliptical variations.

Many changes of detail may be made without departing from the broad principles which I have disclosed. For instance, as shown in Figure 13, if it is desired to make a tape representing a spiral, the slide 190 of Figure 1 may be fed inwardly or outwardly by screw 360 which is rotatable in bearings 361 and 362 attached to arm 185. This screw is rotated by attached bevel gear 363 which is caused to rotate by cooperating bevel gear 364 fastened to shaft 186 which in this case is fixed and projects through a bore in arm 185. A suitable bearing fastened to arm 185 and surrounding shaft 186 allows this arm to be rotated around the shaft. Therefore, if this construction is used with the arm or rack 106 and other associated elements of Figure 1, a tape representing spiral movement will be made as handle 196 is turned. The spiral movement can be enlarging or contracting according to the direction of rotation of the handle and different screws or different gears or other drive elements such as cones or the like may be used to produce spirals of different pitch or radial change per revolution. Other changes of detail may likewise be easily made. For example, the member 13 of Figure 1 may be pivoted to rod 21 and may be adjusted at various angles. This member would then be pushed to the left, along with the rod, by slide 3 or a projection therefrom. Slide 47 could be made to actuate the angularly set arm 13 if attached to rod 21 or the equivalent. It is contemplated also that circular movements of members about pivots might be used instead of linear movements. The scale 18 could be attached to rod 21 or it could be fixed and observed when the arm 13 is in starting position.

While racks are shown as operating rotary commutators in various modifications, any equivalent movable members operating pulse producing means such as switches, linearly spaced contacts, and brushes, or the like, can be employed.

In the device shown in Figure 4, if two dimensional operation is desired, one commutator could be driven at fixed speed by the disc and only one movable wheel need be used. If three dimensional operation is desired, the two adjustable wheels can be retained and a third commutator can be driven by the periphery of the disc, or otherwise. Gear teeth could be provided on the disc periphery.

In putting the magnetized spots, areas, or other characterizations on the tape or other record, it is desirable at times to graduate the lengthwise spacing of the characterizations in order to accelerate or decelerate a motor at a desired or operable rate. This can be done by arranging a number of magnetizing heads according to the desired spacing and then energizing them simultaneously after placing them in the tape track associated with the selected motor. Another method of accomplishing the same result is to use one recording head for one motor and to energize it repeatedly after moving the tape spaced distances as indicated by a scale or other indicating means. An additional method is to move the tape by means of a variable ratio drive and continuously to change the drive ratio between the step motor and the tape drive roller during the time interval in which it is desired to provide the graduated spacing of characterizations. Similarly, other means for accomplishing the same result may be used.

Intermittent movement of the tape or other record has been described but the tape may be driven at substantially constant speed if desired. It is obvious that the recording heads could be moved relative to the tape if that is preferred. Generally, however, it is more convenient to move the tape or other record.

What I claim is:

1. In a device for making a record representing movement of an element at an angle relative to a reference axis, first means for recording characterizations representing movement of said element relative to said axis, second means for recording characterizations representing movement of said element relative to a coordinate axis, means including a movable member for producing a predetermined number of spaced energizations of said first recording means, a second member having a surface settable at said angle with respect to a plane containing an axis of movement of said movable member, and means including means in contact with said surface and moved thereby for producing spaced energizations of said second recording means at a rate proportional to the degree of said angle.

2. In a device for making a record representing movement of an element in an arc of a circle, first means movable relative to an axis of reference, second means movable relative to a second axis of reference, first means for recording characterizations representing movement of said first movable means, second means for recording characterizations representing movement of said second movable means, a rotatable member, means mounting said rotatable member for rotation about the axis of said mounting means, pivot means connecting one of said movable means with said rotatable member means for carrying, said movable means to cause displacement of one of said movable means in direction parallel with one said axis when the other movable means is displaced in said direction parallel with the other said axis, means operatively associating said movable means and said recording means, scale means for indicating the angle which a radial line passing through the axes of said mounting means and said pivot means makes with respect to a reference, and means for rotating said rotatable member about the axis of rotation thereof.

3. The device as described in claim 2, and including adjustable means for placing the axis of said pivot means at predetermined radial distances from the axis of said mounting means.

4. In a device for making a record representing movement of an element along an arc of a circle, first means for recording characterizations representing movement of said element relative to one axis of reference, second means for recording characterizations representing movement of said element relative to another axis of reference, a first linearly movable member movable in direction parallel with one said axis, a second movable member movable in directions parallel with both said axes, means guiding said movable members to cause displacement of said first movable member in direction parallel with one said axis when the said second member is displaced in directions parallel with both said axes, means rotatable about an axis, pivot means attaching one of said movable members to said rotatable means the axes of said pivot means and said rotatable means being substantially parallel; means operated by said first linearly movable member for causing said first recording means to be effectively intermittently energized at a rate proportional to the rate of movement of said first movable member with reference to said one axis of reference, and means operated by said second movable member for causing said second recording means to be effectively intermittently energized at a rate proportional to the rate of movement of said second movable member relative to the said other axis of reference, means for pivotally fastening said pivot means to said rotatable means at predetermined different radial distances from the axis of rotation of said rotatable means, and means for indicating angular positions of said rotatable means with respect to a reference.

5. The device for making a record as described in claim 4, and including means for causing relative movement between said record and said recording means at a rate proportional to the rate of intermittent energization of the most rapidly energized recording means.

6. The device for making a record as described in claim 4, and including means for causing relative movement in steps between said record and said recording means.

7. The device for making a record as described in claim 4, and including a step motor for producing relative movement between said record and said recording means, electrical circuit means for controlling said motor, circuit means for energizing the first recording means, circuit means for energizing the second recording means, and switch means for electrically associating said motor control circuit means with either said recording means circuit.

8. In a device for making a record representing movement of an element along an arc of a circle, first means for recording characterizations representing movement of said element relative to one axis of reference, second means for recording characterizations representing movement of said element relative to another axis of reference, first rack means and a guide therefor, second rack means and a guide therefor attached to said first rack means to guide movement of said second rack means in direction at an angle to the direction of movement of said first rack means, first commutator means driven by said first rack means, first electrical circuit means associating said first commutator means and said first recording means to cause intermittent energization thereof at a rate proportional to the rate of movement of said first rack means, second commutator means driven by said second rack means, second electrical circuit means associating said second commutator means with said second recording means to cause intermittent energization thereof at a rate proportional to the rate of movement of said second rack means relative to the guide thereof, a rotatable member and means mounting said member for rotation about an axis, and pivot means connecting said second rack means and said rotatable member, means for pivotally attaching said pivot means to said rotatable member at predetermined different radial distances from the axis of rotation of said rotatable member, and means for indicating the angular position of said rotatable member with respect to a reference.

9. The device as described in claim 8, and including, means for indicating the angular position of a plane including the axes of said pivot and said rotatable member mounting means, with respect to a reference, and means for rotating said rotatable member.

10. The device as described in claim 8, and including means for varying the radial distance of said pivot means from the axis of said rotatable means, means for indicating the angular position of the axis of said pivot with respect to the axis of rotation of said rotatable means and a reference, and means for producing relative movement between said record and said recording means.

11. In a device for making a record representing movement of an element along a plurality of circular arcs in a plurality of planes, means for recording characterizations representing movement of said element along said arcs, a pair of relatively movable members, another pair of relatively movable members, means responsive to movement of said members for producing effectively intermittent electrical energization, circuit means associating said intermittent energization producing means with said recording means, rotatable means, pivot means operatively attaching one pair of said members to said rotatable means, and other pivot means operatively attaching the other pair of said members to said rotatable means, and means for rotating said rotatable means to cause relative movement of said members thereby causing intermittent electrical energization of said recording means corresponding to said relative movement.

12. The device of claim 11, and including means for indicating angular positions of said pivot means with respect to the axis of said rotatable means and a reference.

13. The device as described in claim 11, and including means for varying the radial distances of said pivot means from the axis of said rotatable means.

14. The device as described in claim 4, and including means associated with said rotatable means and moved as a result of rotation thereof, for varying the radial distance of said pivot means from the axis of said rotatable means in proportion to the angular rotation of said rotatable means.

15. In a device for making a record representing three dimensional movement of an element, first, second, and third means for recording characterizations representing movement of said element, means including linearly movable means for causing a predetermined number of intermittent energizations of said first recording means, a member moved by said linearly movable means and settable at various angles relative thereto, means including means operated by movement of said member for producing intermittent energizations of said second recording means in proportion to the angle of setting of said member, another member moved by said linearly movable means and settable at various angles relative thereto, and means including means operated by movement of said another member for producing intermittent energizations of said third recording means in proportion to the angle of setting of said other member.

16. In a device for making a record representing movement of an object relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, a member moved by displacement of said linearly movable means in one direction and settable at various angles relative thereto, means including means operated by movement of said member for producing intermittent energizations of said second recording means in proportion to the angular setting of said member, another member moved by displacement of said linearly movable means in direction opposite to said one direction and settable at various angles relative thereto, means including means operated by movement of said other member for producing intermittent energizations of said second recording means in proportion to the angular setting of said other member and means for reciprocating said linearly movable means.

17. The device as described in claim 16, said means for producing intermittent energizations of said second recording means including a commutator, a pair of one way clutches for rotating said commutator in one direction, means associating one said clutch with one said member to be driven as a result of movement thereof, and means associating the other said clutch with said other member to be driven as a result of movement thereof.

18. In a device for making a record representing movement of an element relative to two axes of reference, first means for recording characterizations representing movement of said element relative to one axis, second means for recording characterizations representing movement of said element relative to the other said axis, a rotatable member, means for rotating said member, rotatable means driven by said rotatable member at speeds depending upon the position of said rotatable means relative to said member, means for setting said rotatable means at predetermined position relative to said member, means including means driven by said rotatable means for providing intermittent energizations of one of said recording means, and means including second means driven by said rotatable member for providing intermittent energizations of the other said recording means.

19. The device as described in claim 18, said second driven means being also adjustable with respect to said rotatable member to cause variation of the rate of energization of the recording means associated with said second driven means.

20. The device as described in claim 18, said rotatable member comprising a disc and at least one of said rotatable means comprising a wheel adjustable along a radius thereof.

21. In a device for making a record representing movement of an element in an elliptical path, first means for recording characterizations representing movement of said element relative to one axis of reference, second means for recording characterizations representing movement of said element relative to another axis of reference, a linearly movable member, means including means actuated by said linearly movable member for providing intermittent energization of said first recording means at a rate proportional to the rate of movement of said linearly movable member, a second member movable in direction parallel with the direction of movement of said linearly movable member and also movable relative thereto in direction at right angles to the direction of movement thereof, means including means actuated by said second member for providing intermittent energization of said second recording means at a rate proportional to the rate of movement of said second member relative to said first member, first pivot means attached to said second movable member, first guide means for said first pivot means, second pivot means supporting said first guide means for rotation about an axis on the major axis of an ellipse, second guide means for said first pivot means, third pivot means supporting said second guide means for rotation about an axis on the major axis of said ellipse, and drive means for increasing the distance of said first pivot means from the axis of said second pivot means at predetermined rate and for simultaneously decreasing the distance of said first pivot means from the axis of said third pivot means at said predetermined rate.

22. The device as described in claim 21 and including means for setting said second and third pivot means predetermined distances apart.

23. The device as described in claim 21, and including scale means for indicating the distance of separation of the axes of said second and third pivot means, scale means for indicating the distance of separation of the axes of said first and second pivot means, and scale means for indicating the distance of separation of the axes of said first and third pivot means.

24. The device as described in claim 21, said drive means including a synchronous type motor for causing movement of said first pivot means along one said guide means, another synchronous type motor for causing movement of said first pivot means along the other said guide means, and circuit means connecting said motors to cause synchronous rotation thereof.

25. The device as described in claim 21, and including yielding means for urging said first pivot means to move in predetermined direction.

26. In a device for making a record representing movement of an element relative to two axes of reference, in combination first means for recording characterizations representing movement of said element relative to one said axis, second means for recording characterizations representing movement of said element relative to the other said axis, third means for producing a plurality of intermittent energizations of said first and second recording means to represent movement of said element along a linear path at an angle to a reference, fourth means for producing a plurality of intermittent energizations of said first and second recording means to represent movement of said element along a circular path, and settable means operatively connecting said third and fourth means for making either the circular path energizations or the angle path energizations effective, to provide effectively continuous movement of said element from linear movement to circular movement or from circular movement to linear movement according to the setting of said operably connecting means.

27. The device as described in claim 26, and including means for producing a plurality of intermittent energizations of said first and second recording means to represent movement of said element along a non-circular path, and means for making said non-circular path energizations effective or ineffective.

28. The device as described in claim 26, and including means for producing a plurality of intermittent energizations of said first and second recording means to represent movement of said element along an elliptical path.

29. The device as described in claim 4, and including means for changing the distance of said pivot means from said rotatable means axis at uniform rate.

30. The device as described in claim 4 and including a screw for changing the distance of said pivot means from the axis of said rotatable means.

31. In a device for making a record representing movement of an element relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, a member moved by said linearly movable means and settable at various angles relative thereto, means including a movable element in contact with said member and moved thereby to cause intermittent energization of said second recording means a number of times proportionate to said first named number, and including means for reciprocating said linearly movable means through repeated forward and reverse movements of equal length.

32. In a device for making a record representing movement of an element relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, a member moved by said linearly movable means and settable at various angles relative thereto, means including a movable element in contact with said member and moved thereby to cause intermittent energization of said second recording means a number of times proportionate to said first named number, and including means for reciprocating said linearly movable means, said means for causing intermittent energization of said second recording means including drive means effective in only one direction.

33. In a device for making a record representing movement of an element relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, a member moved by said linearly movable means and settable at various angles relative thereto, means including a movable element in contact with said member and moved thereby to cause intermittent energization of said second recording means a number of times proportionate to said first named number, and including means for reciprocating said linearly movable means in alternately opposite directions, and means associated with said linearly movable means for making at least one of said recording means ineffective during travel of said linearly movable means in one direction.

34. In a device for making a record representing movement of an element relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, a member moved by said linearly movable means and settable at various angles relative thereto, means including a movable element in contact with said member and moved thereby to cause intermittent energization of said second recording means a number of times proportionate to said first named number, and including means for moving said linearly movable means in alternately opposite directions, means for producing one step of relative movement of said record and said first recording head for each intermittent energization thereof, and means for making said step relative movement means and said first recording means ineffective during travel of said linearly movable means in one direction.

35. In a device for making a record representing movement of an element relative to two reference axes, first means for recording characterizations representing measured movement of said element relative to one said axis, second means for recording characterizations representing measured movement of said element relative to the other said axis, means for causing a predetermined number of intermittent energizations of said first recording means, means operatively connected with said intermittent energization causing means for causing a predetermined proportionate number of energizations of said second recording means with relation to the number of intermittent energizations of said first recording means, and including third means for recording characterizations for causing reversal of direction of movement of said element relative to one said axis, fourth means for recording characterizations for causing reversal of direction of movement of said element relative to the other said axis, and means for individually making said third and fourth recording means effective or ineffective.

36. In a device for making a record representing movement of an element relative to two reference axes, first means for recording characterizations representing movement of said element relative to one said axis, second means for recording characterizations representing movement of said element relative to the other said axis, means including linearly movable means for causing a predetermined number of intermittent energizations of said first recording means, means including means moved by said linearly movable means and settable to cause intermittent energization of said second recording means a number of times proportionate to said first named number, and including electromagnetic means connected with said linearly movable means for causing movement thereof relatively rapidly in one direction, power means connected with said linearly movable means for moving said linearly movable means at relatively slower rate in opposite direction, and means for regulating the rate of movement of said linearly movable means in said opposite direction.

References Cited in the file of this patent

UNITED STATES PATENTS

| | | |
|---|---|---|
| 1,873,126 | Hugershoff | Aug. 23, 1932 |
| 2,340,562 | Rey | Feb. 1, 1944 |
| 2,423,440 | Neergaard | July 8, 1947 |
| 2,445,546 | Segebaden | July 20, 1948 |
| 2,484,968 | Sponagle | Oct. 18, 1949 |
| 2,537,770 | Livingston | Jan. 9, 1951 |
| 2,620,890 | Lee et al. | Dec. 9, 1952 |
| 2,628,539 | Neergaard | Feb. 17, 1953 |
| 2,733,510 | Darago | Feb. 7, 1956 |
| 2,755,160 | Holmes | July 17, 1956 |
| 2,767,243 | Steeneck | Oct. 16, 1956 |
| 2,776,099 | Ferrill | Jan. 1, 1957 |
| 2,787,197 | Gordon | Apr. 2, 1957 |
| 2,852,189 | Becker et al. | Sept. 16, 1958 |

OTHER REFERENCES

Publication—"A Numerically Controlled Milling Machine," Mass. Inst. Tech. Lab., copyright 1951, pages 1–10. Div. 13.